US012659058B2

(12) United States Patent
Fan et al.

(10) Patent No.: US 12,659,058 B2
(45) Date of Patent: Jun. 16, 2026

(54) CHANNEL MEASUREMENT METHOD AND APPARATUS

(71) Applicant: HUAWEI TECHNOLOGIES CO., LTD., Shenzhen (CN)

(72) Inventors: Bo Fan, Chengdu (CN); Lei Chen, Shenzhen (CN); Xi Zhang, Chengdu (CN); Shitong Yuan, Chengdu (CN); Fengwei Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 18/466,838

(22) Filed: Sep. 14, 2023

(65) Prior Publication Data

US 2023/0421273 A1 Dec. 28, 2023

Related U.S. Application Data

(63) Continuation of application No. PCT/CN2022/082926, filed on Mar. 25, 2022.

(30) Foreign Application Priority Data

Apr. 2, 2021 (CN) .......................... 202110362432.7

(51) Int. Cl.
| | |
|---|---|
| *H04W 72/23* | (2023.01) |
| *H04B 7/06* | (2006.01) |
| *H04B 17/309* | (2015.01) |

(52) U.S. Cl.
CPC ....... *H04B 17/309* (2015.01); *H04B 7/06968* (2023.05); *H04W 72/23* (2023.01)

(58) Field of Classification Search
CPC .. H04L 1/0026; H04W 24/10; H04W 72/542; H04W 72/21; H04W 74/006; H04W 72/232
See application file for complete search history.

(56) References Cited

U.S. PATENT DOCUMENTS

| | | | |
|---|---|---|---|
| 2018/0191598 A1* | 7/2018 | Yu | .......................... H04L 43/16 |
| 2018/0219606 A1 | 8/2018 | Ng et al. | |

(Continued)

FOREIGN PATENT DOCUMENTS

EP 3562083 A1 10/2019

*Primary Examiner* — Romani Ohri

(57) ABSTRACT

This application discloses a channel measurement method and apparatus. A network device sends downlink signaling, to indicate or activate a beam. A terminal device determines the beam indicated or activated by using the downlink signaling, determines, based on an association relationship between a beam and a channel measurement configuration, a channel measurement configuration associated with the beam, performs channel measurement based on the channel measurement configuration, to obtain a channel measurement result, and reports the channel measurement result to the network device. According to the channel measurement solution in this application, when channel quality of a new beam needs to be measured, the network device does not need dedicated signaling to indicate a channel measurement configuration associated with the new beam. When the beam is indicated or activated, the terminal device is triggered to perform channel measurement, to implement low-latency and low-overhead channel measurement.

15 Claims, 8 Drawing Sheets

(56) References Cited

U.S. PATENT DOCUMENTS

| | | | |
|---|---|---|---|
| 2020/0195324 A1 | 6/2020 | Grant et al. | |
| 2020/0213993 A1* | 7/2020 | Liu | H04W 72/21 |
| 2022/0264348 A1* | 8/2022 | Manolakos | H04B 17/345 |
| 2023/0337278 A1* | 10/2023 | Wang | H04W 24/10 |
| 2024/0032061 A1* | 1/2024 | Zhou | H04W 72/1268 |

* cited by examiner

Beam 1—Trigger state 1

Beam 2—Trigger state 2

Beam 3—Trigger state 3

Beam 64—Trigger state 64

```
TCI-State ::=                        SEQUENCE {
    tci-StateId                          TCI-StateId,
    qcl-Type1                            QCL-Info,
    qcl-Type2                            QCL-Info
    ...
}

QCL-Info ::=                         SEQUENCE {
    cell                                 ServCellIndex
    bwp-Id                               BWP-Id
    referenceSignal                      CHOICE {
        csi-rs                               NZP-CSI-RS-ResourceId,
        ssb                                  SSB-Index
    },
    qcl-Type                             ENUMERATED {typeA, typeB, typeC, typeD},
    ...
}
```

FIG. 3

| R | Serving cell identifier | | | | | Bandwidth part identifier | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

FIG. 4

CHANNEL MEASUREMENT METHOD AND APPARATUS

CROSS-REFERENCE TO RELATED APPLICATIONS

This application is a continuation of International Application No. PCT/CN2022/082926, filed on Mar. 25, 2022, which claims priority to Chinese Patent Application No. 202110362432.7, filed on Apr. 2, 2021. The disclosures of the aforementioned applications are hereby incorporated by reference in their entireties.

TECHNICAL FIELD

This application relates to the field of communication technologies, and in particular, to a channel measurement method and apparatus.

BACKGROUND

As a terminal device moves, an optimal downlink transmit beam corresponding to the terminal device changes. For example, as shown in FIG. 1, as the terminal device moves, an optimal downlink transmit beam changes from a beam 1 to a beam 2. Therefore, as the terminal device moves, a network device needs to update a transmit beam (beam 1→beam 2) pointing to the terminal device, that is, needs to perform beam switching. After beam switching, the network device needs to obtain channel information corresponding to the new beam, and perform data transmission based on the channel information. The channel information of the new beam is obtained by measuring a corresponding reference signal resource. Specifically, the network device configures the terminal device to measure a specified reference signal resource, and the reference signal resource is sent through the new beam. The terminal device may obtain, by measuring quality of the reference signal resource, channel quality corresponding to the new beam. Then, the terminal device reports the channel quality of the new beam to the network device, and the network device may obtain the channel quality of the new beam.

To measure the channel quality of the new beam, dedicated signaling (for example, radio resource control (RRC) signaling or a media access control element (MAC CE)) is needed to indicate a to-be-measured resource or a beam used by the resource. After receiving the RRC signaling and the MAC CE, the terminal device determines, based on the indicated new beam, a specific receive beam to measure the reference signal resource, to obtain the channel information corresponding to the new beam. However, these signaling indications have a specific latency and specific overheads. For example, the RRC signaling requires a latency of dozens of milliseconds to indicate the to-be-measured resource. In a high-speed movement scenario, beam switching is frequently performed. If channel information of a new beam cannot be quickly obtained after switching to the new beam, a transmission performance loss is caused.

Alternatively, a plurality of trigger states (trigger states) may be preconfigured, and each trigger state may be used to measure channel information of one beam. The trigger state may be considered as a parameter set, including an associated resource and an associated report configuration, and is used to implement aperiodic measurement/trigger channel measurement. The network device may use downlink control information (DCI) to indicate a trigger state, and it means that channel measurement corresponding to the trigger state needs to be triggered. In other words, the terminal device is required to measure a resource associated with the trigger state, and report a measurement result based on an associated report configuration.

As shown in FIG. 2, a plurality of trigger states may be preconfigured, and a beam of a resource associated with each trigger state is configured as a downlink transmit beam. When the network device needs to measure a downlink transmit beam, the network device sends DCI to trigger a corresponding trigger state. In this manner, channel information of a new beam may also be measured. A trigger state is indicated by using DCI to trigger channel measurement of the new beam, and a latency is less than that of RRC signaling or MAC CE signaling. However, when there are a large quantity of beams, a large quantity of trigger states need to be configured, and a specific one of the trigger states is indicated by using DCI. For example, 64 trigger states are configured, and a 6-bit field is required to indicate a specific one of the 64 trigger states. This causes high DCI signaling overheads.

In view of this, how to implement low-latency and low-overhead channel measurement is a problem that needs to be resolved in this application.

SUMMARY

This application provides a channel measurement method and apparatus, to implement low-latency and low-overhead channel measurement.

According to a first aspect, a channel measurement method is provided. The method includes: A terminal device determines a beam indicated or activated by using downlink signaling. The terminal device determines, based on an association relationship between a beam and a channel measurement configuration, a channel measurement configuration associated with the beam. The terminal device performs channel measurement based on the channel measurement configuration, to obtain a channel measurement result. The terminal device reports the channel measurement result. In this aspect, when channel quality of a new beam needs to be measured, a network device does not need dedicated signaling to indicate a channel measurement configuration associated with the new beam. When the beam is indicated or activated, the terminal device is triggered to perform channel measurement, to implement low-latency and low-overhead channel measurement.

That a terminal device determines a beam indicated or activated by using downlink signaling includes: The terminal device receives the downlink signaling, where the downlink signaling is for indicating or activating the beam.

The downlink signaling may be downlink control information, and the downlink control information may activate one or more beams. When a media access control element activates a single beam, the downlink signaling may alternatively be the media access control control element. In this case, the network device does not need to send the downlink control information to activate the beam.

That the terminal device performs channel measurement based on the channel measurement configuration, to obtain a channel measurement result may be that the terminal device performs, based on the channel measurement configuration, channel measurement on a reference signal sent through the beam, to obtain the channel measurement result of the beam. According to a second aspect, a channel measurement method is provided. The method includes: A network device sends downlink signaling, where the downlink signaling is for indicating or activating a beam. The network device determines, based on an association relationship between a beam and a channel measurement configuration, a channel measurement configuration associated with the beam. The network device sends, through the beam, a reference signal corresponding to the channel measurement configuration. The network device receives a channel measurement result of the reference signal. In this aspect, when channel quality of a new beam needs to be measured, the network device does not need dedicated signaling to indicate a channel measurement configuration associated with the new beam. When the beam is indicated or activated, a terminal device is triggered to perform channel measurement, to implement low-latency and low-overhead channel measurement.

With reference to the first aspect or the second aspect, in a possible implementation, the channel measurement configuration includes one or more of the following: a trigger state, a report configuration, a resource, and a resource set.

With reference to the first aspect or the second aspect, in another possible implementation, the association relationship between the beam and the channel measurement configuration includes an association relationship between one or more beams and one or more channel measurement configurations. In this implementation, the network device and the terminal device may predefine, pre-configure, or pre-store the association relationship.

With reference to the first aspect or the second aspect, in another possible implementation, the one or more beams include at least one of the following: one or more beams configured by using RRC signaling; one or more beams activated by using MAC CE signaling; and one or more beams indicated by using DCI signaling.

With reference to the first aspect or the second aspect, in another possible implementation, the one or more channel measurement configurations include at least one of the following: a channel measurement configuration in which a first parameter is configured, where the first parameter indicates that the channel measurement configuration is a first channel measurement configuration; a channel measurement configuration in which a first parameter is configured as a first option, where the first option indicates that the channel measurement configuration is a first channel measurement configuration; and a channel measurement configuration configured in a first configuration set, where the channel measurement configuration in the first configuration set is a first channel measurement configuration, and the first channel measurement configuration is a channel measurement configuration used to automatically measure a channel of an indicated or activated beam. In this implementation, a specific configuration is performed on the first channel measurement configuration, so that the terminal device may determine, from a plurality of channel measurement configurations, a specific channel measurement configuration used to automatically measure the channel of the indicated or activated beam.

With reference to the first aspect or the second aspect, in another possible implementation, the association relationship between the beam and the channel measurement configuration includes: the one or more beams correspond to a first order, the one or more channel measurement configurations correspond to a second order, and the one or more beams are one-to-one associated with the one or more channel measurement configurations based on the corresponding orders; the first order includes any one of the following: a configuration order, an activation order, an indication order, a descending order of indexes, and an ascending order of indexes; and the second order includes any one of the following: a configuration order, an activation order, an indication order, a descending order of indexes, and an ascending order of indexes. In this implementation, the one or more beams in any one of the foregoing orders are one-to-one associated with the one or more channel measurement configurations based on any one of the foregoing orders. The first order and the second order may be randomly combined for sorting, to improve flexibility of setting the association relationship.

With reference to the first aspect or the second aspect, in another possible implementation, any one of the one or more channel measurement configurations has a quasi-colocation (QCL) relationship with a beam associated with the channel measurement configuration.

With reference to the first aspect or the second aspect, in another possible implementation, the association relationship between the beam and the channel measurement configuration includes: the one or more beams and the one or more channel measurement configurations having a QCL relationship have an association relationship.

With reference to the first aspect or the second aspect, in another possible implementation, that the one or more beams and the one or more channel measurement configurations having a QCL relationship have an association relationship includes: a beam and a channel measurement configuration that correspond to a same transmission configuration indicator state TCI-state have an association relationship; a beam and a channel measurement configuration that correspond to a same QCL resource have an association relationship; or a beam and a channel measurement configuration whose corresponding QCL resources have the QCL relationship have an association relationship.

With reference to the first aspect or the second aspect, in another possible implementation, the performing channel measurement based on the channel measurement configuration, to obtain a channel measurement result includes: when a first condition is met, performing channel measurement based on the channel measurement configuration, where the first condition includes one or a combination of the following: the beam is different from a beam indicated by using the downlink signaling last time; a type of the beam is a beam for downlink transmission or a beam for uplink-downlink joint transmission; and a switch for a function of automatically triggering channel measurement based on a beam indication is configured as an enabled state. In this implementation, it is set that when the first condition is met, channel measurement is performed based on the determined channel measurement configuration, which reflects selectivity of automatically triggering channel measurement.

With reference to the first aspect or the second aspect, in another possible implementation, the channel measurement configuration is a report configuration, and a type of the report configuration is an aperiodic report configuration triggered by using DCI signaling or a semi-persistent report configuration activated by using DCI signaling; and the report configuration includes a physical uplink control channel (PUCCH) resource used to report the channel measurement result.

With reference to the first aspect or the second aspect, in another possible implementation, the reporting the channel measurement result includes: the downlink signaling is DCI for uplink scheduling, and the channel measurement result is reported through a physical uplink shared channel (PUSCH); and the downlink signaling is DCI for downlink scheduling, and the channel measurement result is reported through a PUCCH. In this implementation, a problem that the DCI for downlink scheduling cannot trigger or activate the aperiodic report configuration and the semi-persistent report configuration is resolved.

According to a third aspect, a channel measurement apparatus is provided, and is configured to perform the method according to any one of the first aspect or the possible implementations of the first aspect. The channel measurement apparatus may be the terminal device according to any one of the first aspect or the possible implementations of the first aspect, or a module used in the terminal device, for example, a chip or a chip system. The channel measurement apparatus includes a corresponding module, unit, or means (means) for implementing the foregoing methods. The module, unit, or means may be implemented by hardware, may be implemented by software, or may be implemented by hardware executing corresponding software. The hardware or the software includes one or more modules or units corresponding to the foregoing function.

With reference to the third aspect, in a possible implementation, the channel measurement apparatus includes a transceiver unit and a processing unit. The processing unit is configured to determine a beam indicated or activated by using downlink signaling. The processing unit is further configured to determine, based on an association relationship between a beam and a channel measurement configuration, a channel measurement configuration associated with the beam. The processing unit is further configured to perform channel measurement based on the channel measurement configuration, to obtain a channel measurement result. The transceiver unit is configured to report the channel measurement result.

With reference to the third aspect, in another possible implementation, the channel measurement apparatus includes a processor. The processor is configured to: be coupled to a memory, read instructions in the memory, and implement the following steps according to the instructions: determining a beam indicated or activated by using downlink signaling; determining, based on an association relationship between a beam and a channel measurement configuration, a channel measurement configuration associated with the beam; performing channel measurement based on the channel measurement configuration, to obtain a channel measurement result; and controlling a communication interface to report the channel measurement result.

For example, the channel measurement apparatus further includes a memory, the memory is coupled to at least one processor, and the at least one processor is configured to run program instructions stored in the memory, so that the channel measurement apparatus performs the method according to any one of the first aspect or the possible implementations of the first aspect.

In a possible implementation, the memory is configured to store the program instructions and data. The memory is coupled to the at least one processor, and the at least one processor may invoke and execute the program instructions stored in the memory, so that the channel measurement apparatus performs the method according to any one of the first aspect or the possible implementations of the first aspect.

For example, the channel measurement apparatus further includes a communication interface, and the communication interface is used by the channel measurement apparatus to communicate with another device. When the channel measurement apparatus is a terminal device, the communication interface is a transceiver, an input/output interface, a circuit, or the like.

In a possible design, the channel measurement apparatus includes the at least one processor and the communication interface, configured to perform the method according to any one of the first aspect or the possible implementations of the first aspect. Specifically, the at least one processor communicates with the outside through the communication interface. The at least one processor is configured to run a computer program, so that the channel measurement apparatus performs the method according to any one of the first aspect or the possible implementations of the first aspect. It may be understood that the outside may be an object other than the processor, or an object other than the channel measurement apparatus.

In another possible design, the channel measurement apparatus is a chip or a chip system. The communication interface may be an input/output interface (where the foregoing sending operation corresponds to an output operation of the chip, and the foregoing receiving operation corresponds to an input operation of the chip), an interface circuit, an output circuit, an input circuit, a pin, a related circuit, or the like on the chip or the chip system. The processor may alternatively be a processing circuit or a logic circuit.

For technical effects brought by any design manner in the third aspect, refer to technical effects brought by different design manners in the first aspect. Details are not described herein again.

According to a fourth aspect, a channel measurement apparatus is provided, and is configured to perform the method according to any one of the second aspect or the possible implementations of the second aspect. The channel measurement apparatus may be the network device according to any one of the second aspect or the possible implementations of the second aspect, or a module used in the network device, for example, a chip or a chip system. The channel measurement apparatus includes a corresponding module, unit, or means for implementing the foregoing methods. The module, unit, or means may be implemented by hardware, may be implemented by software, or may be implemented by hardware executing corresponding software. The hardware or the software includes one or more modules or units corresponding to the foregoing function.

With reference to the fourth aspect, in a possible implementation, the channel measurement apparatus includes a transceiver unit and a processing unit. The transceiver unit is configured to send downlink signaling, where the downlink signaling is for indicating or activating a beam. The processing unit is configured to determine, based on an association relationship between a beam and a channel measurement configuration, a channel measurement configuration associated with the beam. The transceiver unit is further configured to send, through the beam, a reference signal corresponding to the channel measurement configuration. The transceiver unit is further configured to receive a channel measurement result of the reference signal.

With reference to the fourth aspect, in another possible implementation, the channel measurement apparatus includes a processor. The processor is configured to: be coupled to a memory, read instructions in the memory, and implement the following steps according to the instructions: controlling a communication interface to send downlink signaling, where the downlink signaling is for indicating or activating a beam; determining, based on an association relationship between a beam and a channel measurement configuration, a channel measurement configuration associated with the beam; controlling the communication interface to send, through the beam, a reference signal corresponding to the channel measurement configuration; and controlling the communication interface to receive a channel measurement result of the reference signal.

For example, the channel measurement apparatus further includes a memory, the memory is coupled to at least one processor, and the at least one processor is configured to run program instructions stored in the memory, so that the channel measurement apparatus performs the method according to any one of the second aspect or the possible implementations of the second aspect.

In a possible implementation, the memory is configured to store the program instructions and data. The memory is coupled to the at least one processor, and the at least one processor may invoke and execute the program instructions stored in the memory, so that the channel measurement apparatus performs the method according to any one of the second aspect or the possible implementations of the second aspect.

For example, the channel measurement apparatus further includes a communication interface, and the communication interface is used by the channel measurement apparatus to communicate with another device. When the channel measurement apparatus is a network device, the communication interface is a transceiver, an input/output interface, a circuit, or the like.

In a possible design, the channel measurement apparatus includes the at least one processor and the communication interface, configured to perform the method according to any one of the second aspect or the possible implementations of the second aspect. Specifically, the at least one processor communicates with the outside through the communication interface. The at least one processor is configured to run a computer program, so that the channel measurement apparatus performs the method according to any one of the second aspect or the possible implementations of the second aspect. It may be understood that the outside may be an object other than the processor, or an object other than the channel measurement apparatus.

In another possible design, the channel measurement apparatus is a chip or a chip system. The communication interface may be an input/output interface (where the foregoing sending operation corresponds to an output operation of the chip, and the foregoing receiving operation corresponds to an input operation of the chip), an interface circuit, an output circuit, an input circuit, a pin, a related circuit, or the like on the chip or the chip system. The processor may alternatively be a processing circuit or a logic circuit.

For technical effects brought by any design manner in the fourth aspect, refer to technical effects brought by different design manners in the second aspect. Details are not described herein again.

According to a fifth aspect, a communication system is provided, including the channel measurement apparatus according to any one of the third aspect or the implementations of the third aspect and the channel measurement apparatus according to any one of the fourth aspect or the implementations of the fourth aspect.

According to a sixth aspect, a computer-readable storage medium is provided, and stores a computer program. When the computer program is run on a computer, the method according to any one of the foregoing aspects or the implementations of the foregoing aspects is performed.

According to a seventh aspect, a computer program product is provided. When the computer program product runs on a computer, the method according to any one of the foregoing aspects or the implementations of the foregoing aspects is performed.

According to an eighth aspect, a computer program is provided. When the computer program is run on a computer, the method according to any one of the foregoing aspects or the implementations of the foregoing aspects is performed.

BRIEF DESCRIPTION OF DRAWINGS

FIG. 3 is a schematic diagram of a transmission configuration indicator state according to an embodiment of this application;

FIG. 4 is a schematic diagram of a structure of a MAC CE for activating a TCI-state;

DESCRIPTION OF EMBODIMENTS

Figure 1:
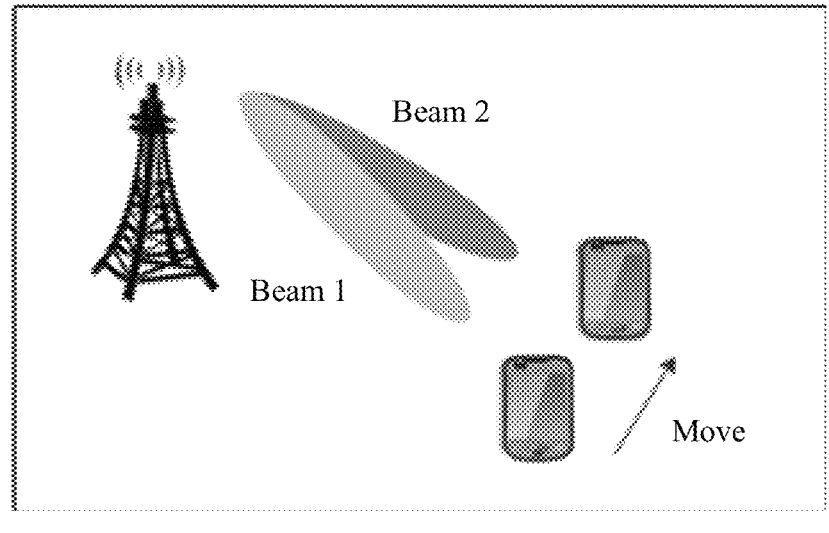
FIG. 1 is a schematic diagram of a scenario of beam switching according to an embodiment of this application.
Figure 2:
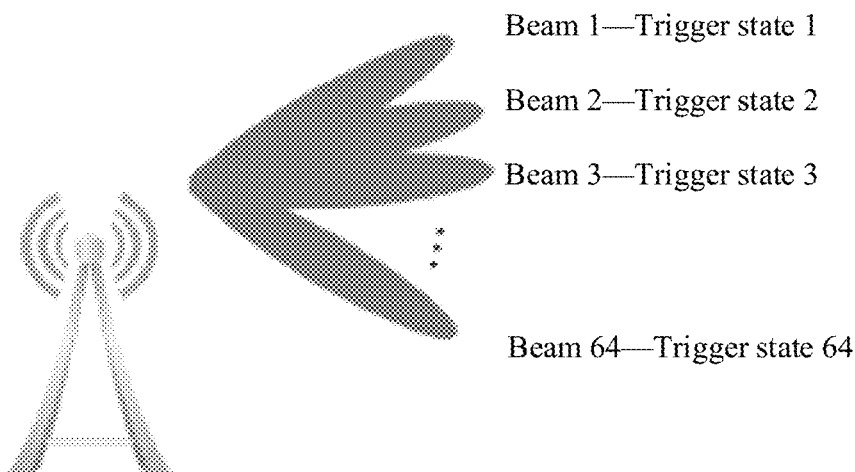
FIG. 2 is a schematic diagram in which a plurality of trigger states are preconfigured.

The following describes embodiments of this application with reference to the accompanying drawings in embodiments of this application.

First, several concepts that may be used in this application are described.

Beam

In a new radio (NR) protocol, the beam may also be understood as a spatial domain filter (spatial domain filter), a spatial filter (spatial filter), a spatial domain parameter (spatial domain parameter), a spatial parameter (spatial parameter), a spatial domain setting (spatial domain setting), a spatial setting (spatial setting), quasi-colocation (QCL) information, a QCL assumption, a QCL indication, or the like. The beam may be indicated by a transmission configuration indicator state (TCI-state) parameter or a spatial relation (spatial relation) parameter. Therefore, in this application, the beam may be replaced with the spatial domain filter, the spatial filter, the spatial domain parameter, the spatial parameter, the spatial domain setting, the spatial setting, the QCL information, the QCL assumption, the QCL indication, a TCI-state (a downlink transmission configuration indicator state (DL TCI-state) or an uplink transmission configuration indicator state (UL TCI-state)), a spatial relation, or the like. The foregoing terms are also equivalent to each other. Alternatively, the beam may be replaced with another term representing the beam. This is not limited in this application.

A beam used to send a signal may be referred to as a transmit beam (Tx beam), and may also be referred to as a spatial domain transmission filter (spatial domain transmission filter), a spatial transmission filter (spatial transmission filter), a spatial domain transmission parameter (spatial domain transmission parameter), a spatial transmission parameter (spatial transmission parameter), a spatial domain transmission setting (spatial domain transmission setting), or a spatial transmission setting (spatial transmission setting). A downlink transmit beam may be indicated by the TCI-state.

A beam used to receive a signal may be referred to as a receive beam (Rx beam), and may also be referred to as a spatial domain reception filter (spatial domain reception filter), a spatial reception filter (spatial reception filter), a spatial domain reception parameter (spatial domain reception parameter), a spatial reception parameter (spatial reception parameter), a spatial domain reception setting (spatial domain reception setting), or a spatial reception setting (spatial reception setting). An uplink transmit beam may be indicated by a spatial relation, an uplink TCI-state, or a sounding reference signal (SRS) resource (indicating a transmit beam using an SRS). Therefore, an uplink beam may alternatively be replaced with the SRS resource.

A transmit beam may refer to distribution of signal strength formed in different directions in space after a signal is transmitted through an antenna, and a receive beam may refer to distribution of signal strength that is of a radio signal received through an antenna and that is in different directions in space.

In addition, the beam may be a wide beam, a narrow beam, or another type of beam. A technology for forming the beam may be a beamforming technology or another technology. The beamforming technology may be a digital beamforming technology, an analog beamforming technology, a hybrid digital/analog beamforming technology, or the like The beam usually corresponds to a resource. For example, during beam measurement, a network device measures different beams by using different resources, and a terminal device feeds back measured resource quality, so that the network device knows quality of a corresponding beam. During data transmission, beam information is also indicated by a resource corresponding to the beam information. For example, the network device indicates information about a physical downlink shared channel (PDSCH) beam of the terminal device by a TCI field in DCI.

Optionally, a plurality of beams that have same or similar communication features may be considered as one beam. One beam may include one or more antenna ports, and is for transmitting a data channel, a control channel, a sounding signal, and the like. The one or more antenna ports forming the beam may also be considered as one antenna port set.

In embodiments of this application, unless otherwise specified, the beam is a transmit beam of the network device. During beam measurement, each beam of the network device corresponds to one resource. Therefore, an index of the resource may uniquely identify a beam corresponding to the resource.

TCI-State (Indicating a Downlink Beam)

A network device may generate different beams that point to different transmission directions. In downlink data transmission, when sending data to a terminal device through a specified beam, the network device needs to notify the terminal device of information about the transmit beam used by the network device. In this way, the terminal device can receive, through a receive beam corresponding to the transmit beam, the data sent by the network device. In the 3GPP R15/R16 protocol, the network device indicates, to the terminal device by a TCI field in DCI, related information of a transmit beam used by the network device. Specifically, a size of the TCI field is 3 bits, and may indicate eight different field values. Each value of the TCI field corresponds to a TCI-state index, and the TCI-state index may uniquely identify a TCI-state. The TCI-state includes several parameters, and the related information of the transmit beam may be determined based on these parameters. The TCI-state is configured by the network device for each terminal device. A structure of the TCI-state is that shown in FIG. 3. Each TCI-state includes an index of the TCI-state (tci-StateId) and two pieces of quasi-colocation information (QCL-Info). Each QCL-Info includes a cell (cell) field and a bandwidth part identifier (bwp-Id) field, to respectively indicate a specific bandwidth part (bandwidth part) of a specific cell for which the TCI-state is used. In other words, different QCL-Info may be configured for different bandwidth parts of different cells or a same cell. The QCL-Info further includes a reference signal (referenceSignal) field, to indicate a specific reference signal resource with which a QCL relationship is formed. In the R15/R16 protocol, the term "beam" is usually not directly used, and the beam is usually replaced with another term. For example, in both data transmission and channel measurement, the beam corresponds to a reference signal resource, and one beam corresponds to one reference signal resource. Therefore, a specific reference signal resource with which a QCL relationship is formed herein essentially means a specific beam with which a QCL relationship is formed. The QCL relationship means that two reference signal resources (or two antenna ports, where antenna ports and reference signal resources are also in a one-to-one correspondence) have some same spatial parameters. Specifically, specific spatial parameters that are the same depends on a type of the QCL-Info, that is, another field of the QCL-Info: a quasi-colocation type (qcl-Type). qcl-Type may have four values {typeA, typeB, typeC, typeD}. typeD is used as an example. typeD indicates that the two reference signal resources have same spatial reception parameter information. That is, two beams have a same receive beam. A maximum of one of the two pieces of QCL-Info included in the TCI-state can be of typeD.

The following uses an example to describe in detail how the network device indicates information about a receive beam for data transmission to the terminal device by the TCI-state according to the R15/R16 protocol. TCI-state configuration, activation, and indication are included.

TCI-state configuration: The network device configures a plurality of TCI-states for the terminal device by using RRC signaling. Each of these TCI-states includes one piece of QCL-Info of typeD. Alternatively, the network device may configure a TCI-state that does not include QCL-info of typeD. However, the TCI-states do not indicate a data transmission beam. Therefore, details are not further described herein.

TCI-state activation: After configuring the plurality of TCI-states, the network device further needs to activate eight TCI-states by using a media access control control element (MAC CE). The eight TCI states are in a one-to-one correspondence with eight values of the TCI field in the DCI. That is, the eight TCI-states corresponding to the eight values of the TCI field in the DCI are determined by using MAC CE signaling. A structure of the MAC CE for activating a TCI-state is that shown in FIG. 4. Fields $T_0$ to $T_{(N-2)\times8+7}$ respectively correspond to TCI-states whose indexes are 0 to $(N-2)\times8+7$ configured in the first step. Each field has a size of 1 bit, and a value may be or 1. The value 1 indicates that the TCI-state is activated, and the value 0 indicates that the TCI-state is not activated. Theoretically, each MAC CE may have eight activation fields whose values are 1, and the others are all 0. TCI-states corresponding to the eight fields whose values are 1 are the eight TCI-states corresponding to the eight values of the TCI field in the DCI. For example, a smallest value 000 of the TCI field corresponds to an activated TCI-state with a smallest index in the MAC CE. The rest may be deduced by analogy. There are many types of MAC CEs. In addition to the MAC CE for activating a TCI-state, there are many MAC CEs for other purposes. This application relates only to a MAC-CE for activating a TCI-state/TCI-state combination. Therefore, unless otherwise specified, the MAC-CE in this application is such a MAC-CE.

TCI-state indication: The network device indicates a specific TCI-state by the TCI field in the DCI. For example, a value of the TCI field in the DCI sent by the network device to the terminal device is 000, indicating that a TCI-state corresponding to 000 is used for the data transmission beam. A reference signal included in QCL-Info whose type is typeD in the TCI-state is a channel state information-reference signal (CSI-RS) whose index is #1, indicating that a beam for data transmission is the same as a receive beam corresponding to the CSI-RS whose index is #1. The receive beam corresponding to the CSI-RS whose index is #1 may be determined through a beam measurement procedure, and is known to the terminal device. Therefore, the terminal device may determine, based on a specific value of the TCI field, a receive beam corresponding to the data transmission beam, to receive data through the corresponding receive beam.

Channel Measurement

Channel measurement is a measurement procedure in the R15 protocol, and is used to measure channel state information of a specific resource, for example, a channel quality indicator (CQI). The channel measurement is classified into downlink channel measurement and uplink channel measurement.

This application mainly relates to the downlink channel measurement. The downlink channel measurement mainly includes four steps.

S1: A network device sends measurement configuration information to a terminal device. The network device sends the measurement configuration information to the terminal device by using RRC signaling. The measurement configuration information mainly includes two parts: resource configuration information and report configuration information.

The resource configuration information is information related to a measurement resource, and is configured by using a three-level structure (resource configuration (resourceConfig)-resource set (resourceSet)-resource (resource)) in a protocol, where (the resource configuration resourceConfig may also be written as resourceSetting). The network device may configure one or more resource configurations for the terminal device. Each resource configuration includes one or more resource sets, and each resource set may include one or more resources. Each resource configuration/resource set/resource includes an index of the resource configuration/resource set/resource. In addition, some other parameters are further included, for example, a resource periodicity and a signal type corresponding to the resource. Each resource may include one or more antenna ports.

The report configuration information is information related to reporting of a measurement result, and is configured through a report configuration (ReportConfig) in the protocol. The network device may configure one or more report configurations for the terminal device. Each report configuration includes report-related information such as a report indicator, report time, a report periodicity, and a report format. In addition, the report configuration further includes the index of the resource configuration, to indicate a specific measurement configuration through which a reported result is measured.

During channel measurement, when a CQI needs to be measured, a corresponding interference signal may be further measured. The interference signal may be measured by measuring an interference measurement resource. The interference measurement resource and a channel measurement resource are configured for the terminal device together, and are respectively configured in different resource configurations. For example, two resource configurations are configured by using RRC signaling, where one resource configuration includes the channel measurement resource, and the other resource configuration includes the interference measurement resource. There are two types of interference measurement resources: a non-zero-power channel state information-reference signal (NZP CSI-RS) and channel state information-interference measurement (CSI-IM).

Beam information of each resource further needs to be configured. In this way, the terminal device knows a beam corresponding to each resource, and determines a receive beam that should be used for receiving. The beam information is encapsulated in a TCI-state, and each channel measurement resource may include a TCI-state, to indicate beam information of the resource. Beam information of the interference measurement resource does not need to be configured, but beam information of a channel measurement resource associated with the interference measurement resource is used by default. For example, when a CSI-IM resource is used as an interference measurement resource, a quantity of CSI-IM resources needs to be equal to and are in a one-to-one correspondence with a quantity of channel measurement resources. A beam of a channel measurement resource corresponding to each CSI-IM resource is used for the CSI-IM by default, and the terminal device measures the channel measurement resource and the CSI-IM resource through a same receive beam. When an NZP CSI-RS resource is used as an interference resource, it is specified that only one channel measurement resource can be configured, and a beam of the channel measurement resource is used for all NZP CSI-RS interference measurement resources.

S2: The network device sends a downlink signal on a resource element corresponding to a resource configured by using the resource configuration information, so that the terminal device determines, by measuring the downlink signal, channel information corresponding to each resource (that is, channel information of a beam corresponding to the resource).

S3: The terminal device measures the downlink signal based on the measurement configuration information, to be specific, a resource to be measured, time-frequency resources on which measurement is performed, an indicator to be measured, and the like.

S4: The terminal device sends a beam measurement report to the network device. The beam measurement report may include an index of one or more resources and channel information corresponding to the resources, for example, a CQI, a rank indication (RI), a precoding matrix indicator (PMI), and a layer indicator (LI).

Common Beam

In a current protocol, a separate beam indication is used for each channel. For example, beams of a PDCCH and a PDSCH are indicated by TCI-states, and beams of a PUCCH and a PUSCH are indicated by spatial relations. Each channel has a corresponding beam. In this application, a common beam is defined, and is used for a plurality of uplink and downlink channels.

The common beam is a same beam used for a plurality of/a plurality of types of channels and/or a plurality of/a plurality of types of reference signals. The plurality of/plurality of types of channels/reference signals include but are not limited to one or more of the following channels/signals: a PDCCH, a PDSCH, a PUCCH, a PUSCH, a physical random access channel (PRACH), a random access message 2, a random access message 3, a random access message 4, a synchronization signal block (SSB), a CSI-RS, a demodulation reference signal (DMRS), a phase tracking reference signal (PTRS), a TRS, an SRS, and the like.

Classification of Common Beams

Common beams may be classified into the following types. Unless otherwise specified, the common beam mentioned subsequently may be any one of the common beams.

Uplink and downlink common beam: simultaneously used for transmission of one or more uplink and downlink channels, such as a PDCCH, a PDSCH, a PUCCH, and a PUSCH.

Uplink common beam: simultaneously used for transmission of a plurality of/a plurality of types of uplink channels, such as a PUCCH and a PUSCH.

Downlink common beam: simultaneously used for transmission of a plurality of/a plurality of types of downlink channels, such as a PDCCH and a PDSCH.

Control channel common beam: simultaneously used for transmission of a plurality of/a plurality of types of control channels, where the control channels include a PDCCH, a PUCCH, and the like.

Data channel common beam: simultaneously used for transmission of a plurality of/a plurality of types of data channels, where the data channels include a PDSCH, a PUSCH, and the like.

Wide common beam: Common beams are classified into two types based on a beam coverage angle. A beam with a large coverage angle is referred to as a wide common beam.

Narrow common beam: Common beams are classified into two types based on the beam coverage angle. A beam with a small coverage angle is referred to as a narrow common beam.

The common beam in this application may be any one of the foregoing, or may be another type of common beam.

Quantity of Common Beams

The network device may configure/activate/indicate a common beam for the terminal device. The common beam is an uplink and downlink common beam. The network device may configure/activate/indicate a plurality of common beams for the terminal device. The plurality of common beams are different types of common beams, for example, an uplink common beam and a downlink common beam, or a control channel common beam and a data channel common beam. The plurality of common beams may alternatively be common beams of a same type, that is, a plurality of common beams of a same type may be configured/activated/indicated for the terminal device.

Form of a Common Beam

The common beam may have a newly defined structure (different from an existing structure of a TCI-state and a spatial relation). For example, the common beam includes information related to an uplink and downlink beam indication, including but not limited to one or more of the following: a common beam ID, a logical cell ID (cell ID), a physical cell ID, a BWP ID (bandwidth part, frequency component), a reference signal resource for determining uplink and downlink beams, a QCL type, and an uplink power control-related parameter (such as a path loss measurement reference signal resource, p0, and closedLoopIndex).

Application Scope of a Common Beam

The common beam may be at a cell level, that is, one common beam is used for transmission of a plurality of channels in one cell. The common beam may be at a BWP level, and is used for transmission of a plurality of beams in one BWP. The common beam may alternatively be across cells, that is, used for transmission of a plurality of channels of a plurality of cells. The plurality of cells may be a plurality of cells in one band (band). The plurality of cells may also be a plurality of inter-band cells. The common beam may be at a CORESET level. To be specific, a same common beam is used for all PDCCHs corresponding to the CORESET, and/or all PDSCHs scheduled by the PDCCH of the CORESET, and/or all PUSCHs scheduled by the PDCCH of the CORESET, and/or PUCCHs/PUSCHs for transmitting ACKs/NACKs of PDSCHs scheduled by the PDCCH of the CORESET.

The common beam is also indicated by a TCI-state or a spatial relation. For example, the downlink common beam is indicated by a TCI-state. The uplink common beam is indicated by a spatial relation.

In other words, a representation form of the common beam in this application in the protocol may be the TCI-state, the spatial relation, or another parameter indicating an uplink/downlink transmission beam.

The technical solutions in embodiments of this application may be used for various communication systems, for example, a 5th generation (5G) mobile communication system or NR. The 5G mobile communication system in this application includes a non-standalone (NSA) 5G mobile communication system or a standalone (SA) 5G mobile communication system. The technical solutions provided in this application may be further used for a future communication system, for example, a sixth generation mobile communication system. Alternatively, the communication system may be a public land mobile network (PLMN), a device-to-device (D2D) communication system, a machine-to-machine (M2M) communication system, an internet of things (IoT) communication system, an internet of vehicles communication system, or another communication system.

5G may use high-frequency communication, that is, use an ultra-high band (>6 GHz) signal to transmit data. A main problem of the high-frequency communication is that signal energy sharply decreases as a transmission distance increases, and this results in a short signal transmission distance. To resolve this problem, an analog beam technology is used in the high-frequency communication. Weighted processing is performed on an antenna array, the signal energy is concentrated in a small angle range, to form a signal similar to a light beam (referred to as an analog beam, a beam for short), so that a transmission distance is extended. Both the network device and the terminal device need to use beams. For example, during downlink transmission, the network device sends data through one transmit beam, and the terminal device receives the data through one receive beam.

During downlink transmission, the transmit beam used by the network device is determined by the network device.

Specifically, an optimal transmit beam is selected from all transmit beams through a beam measurement process. The receive beam used by the terminal device is notified by the network device to the terminal device. For example, during PDSCH transmission, the network device indicates a receive beam of a PDSCH in DCI for scheduling the PDSCH. Specifically, the DCI includes a TCI field, and the TCI field indicates a TCI-state used by the PDSCH. The TCI-state is a parameter set, includes beam-related information, and may indicate a receive beam. Specifically, the TCI-state includes one target reference signal resource, and a PDSCH that uses the TCI-state and the target reference signal resource in the TCI-state have a same receive beam. In other words, if the network device indicates, to the terminal device, that the TCI-state of the PDSCH is a TCI-state, the network device indicates the terminal device to receive the PDSCH through the receive beam of the target reference signal resource in the TCI-state. The receive beam of the target reference signal resource is known. Therefore, the terminal device knows, based on the indication of the DCI, the receive beam for receiving the PDSCH. Similarly, a receive beam of another channel or reference signal is also determined based on a specified TCI-state.

In the R15 protocol, the network device specifies a specific beam for each channel or reference signal, so that the terminal device knows a receive beam corresponding to the channel or reference signal. Specifying a beam for each channel or reference signal separately causes high signaling overheads. To reduce signaling overheads, beam indications of a plurality of channels or reference signals are combined in the R17 protocol. Specifically, the network device may indicate one common beam to the terminal device, and the common beam may be used for a plurality of channels or reference signals. For example, the network device indicates one TCI-state, and the terminal device determines a receive beam of a plurality of channels or reference signals based on the TCI-state. For definitions of the common beam, refer to the foregoing descriptions. For ease of description, in this application, a common beam and an ordinary beam are collectively referred to as beams. That is, the "beam" in embodiments may be a common beam, or a beam of a single channel or reference signal.

Figures 5, 6:
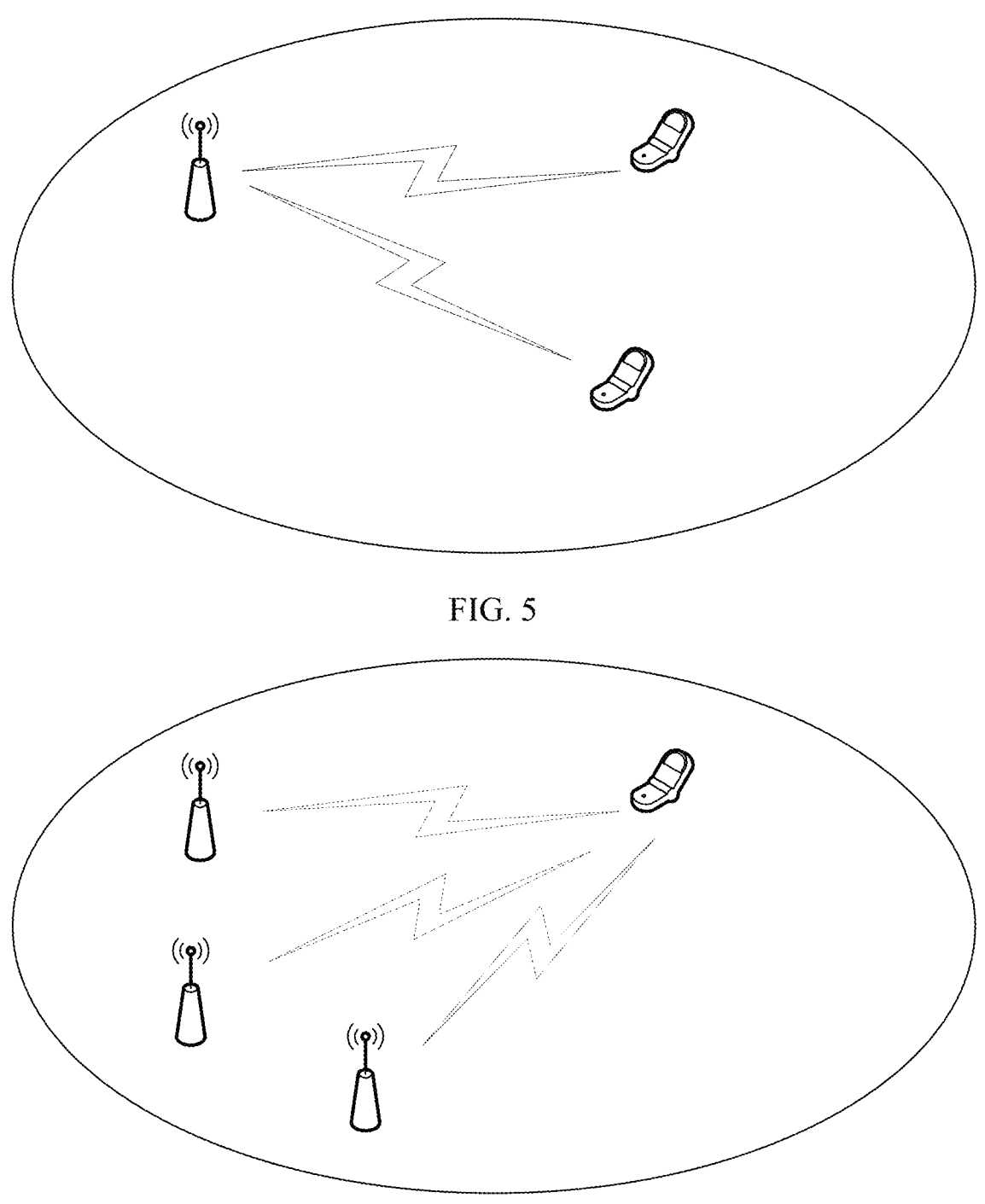
FIG. 5 is a schematic diagram of a communication system according to this application.
FIG. 6 is a schematic diagram of another communication system according to this application.

FIG. 5 is a schematic diagram of a communication system according to this application. The communication system may include one or more network devices (only one network device is shown in the figure) and one or more terminal devices connected to the network device. One network device may transmit data or control signaling to one or more terminal devices. In another communication system shown in FIG. 6, a plurality of network devices may simultaneously transmit data or control signaling to one terminal device.

The network device may be any device having a wireless transceiver function, and includes but is not limited to a base station NodeB, an evolved NodeB eNodeB, a base station in a communication system, a base station or a network device in a future communication system, an access node in a Wi-Fi system, a wireless relay node, a wireless backhaul node, and the like. Alternatively, the network device may be a radio controller in a cloud radio access network (CRAN) scenario. The network device may alternatively be a small cell, a transmission reception point (TRP), or the like. A specific technology and a specific device form that are used for the network device are not limited in embodiments of this application.

The terminal device is a device having a wireless transceiver function. The terminal device may be deployed on land (including an indoor or outdoor device), and may be a handheld device, a wearable device, or a vehicle-mounted device; may be deployed on the water surface, for example, on a ship; or may be deployed in the air, for example, on an airplane, a balloon, or a satellite. The terminal device may be a mobile phone (mobile phone), a tablet computer (pad), a computer having a wireless transceiver function, a wearable device, an uncrewed aerial vehicle, a helicopter, an airplane, a ship, a robot, a mechanical arm, a smart home device, a virtual reality (VR) terminal device, an augmented reality (AR) terminal device, a wireless terminal in industrial control (industrial control), a wireless terminal in self-driving (self-driving), a vehicle, a functional module in a vehicle, a wireless terminal in telemedicine (telemedicine), a wireless terminal in a smart grid (smart grid), a wireless terminal in transportation safety (transportation safety), a wireless terminal (for example, a street lamp) in a smart city (smart city), a wireless terminal in a smart home (smart home), or the like. Application scenarios are not limited in embodiments of this application. Sometimes, the terminal device may also be referred to as user equipment (UE), an access terminal device, a UE unit, a mobile station, a remote station, a remote terminal device, a mobile device, a terminal (terminal), a wireless communication device, a UE agent, a UE apparatus, or the like. A specific technology and a specific device form that are used for the terminal device are not limited in embodiments of this application.

Optionally, in embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

In other words, in embodiments of this application, related functions of the terminal device or the network device may be implemented by one device, may be jointly implemented by a plurality of devices, or may be implemented by one or more functional modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 7A:
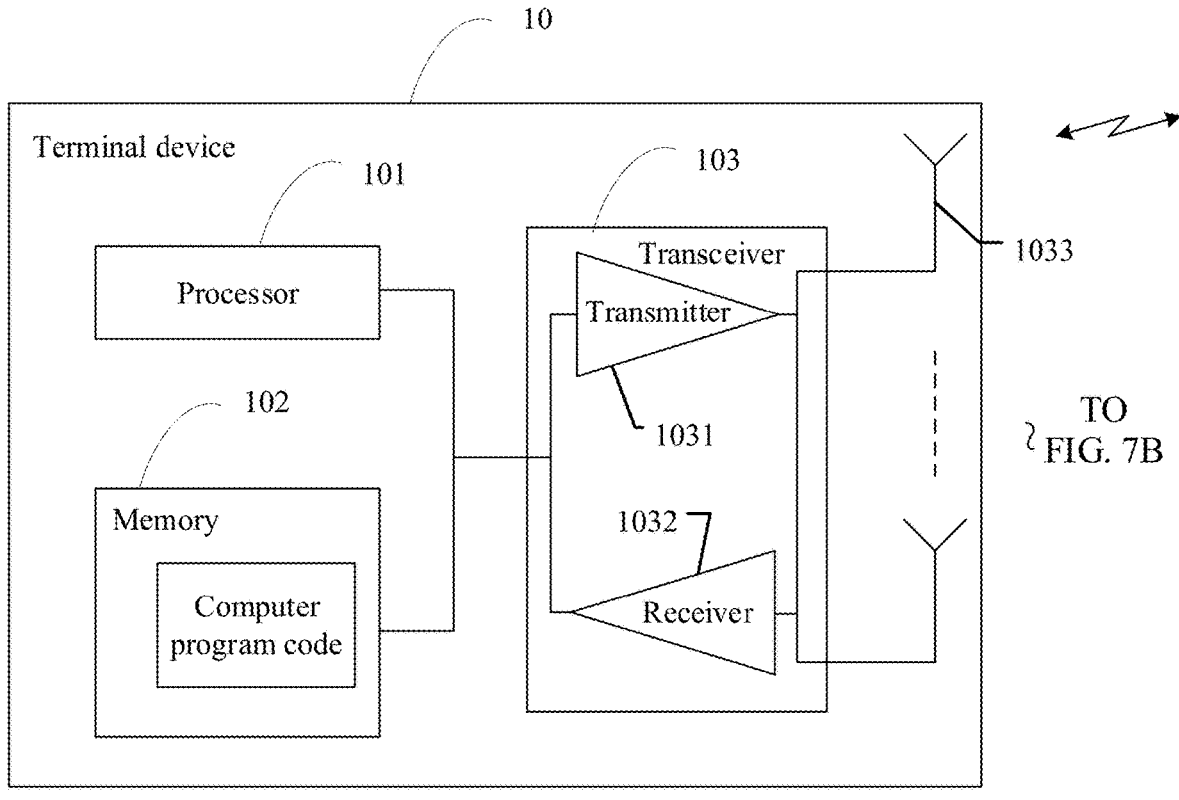
FIG. 7A and FIG. 7B are a schematic diagram of a structure of a channel measurement apparatus according to an embodiment of this application.
Figure 7B:
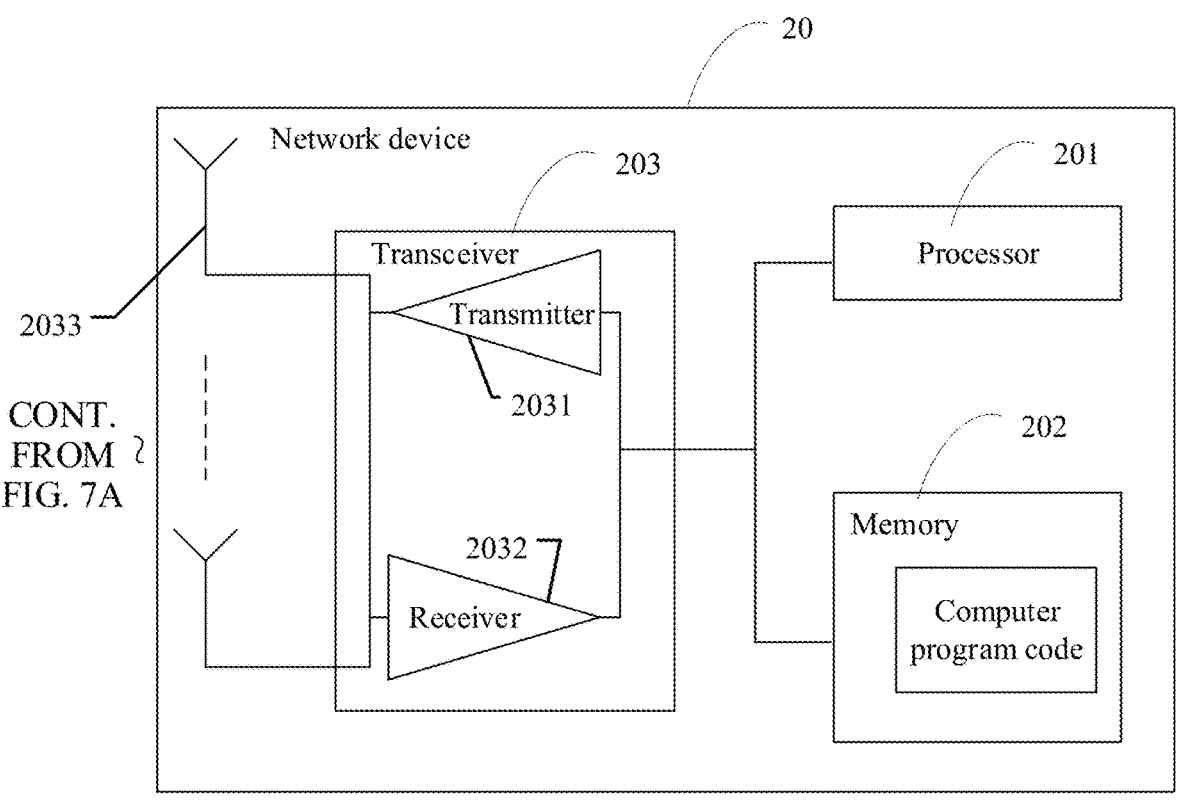

Communication between the network device and the terminal device in the communication systems shown in FIG. 5 and FIG. 6 may alternatively be represented in another form. As shown in FIG. 7A and FIG. 7B, a terminal device 10 includes a processor 101, a memory 102, and a transceiver 103. The transceiver 103 includes a transmitter 1031, a receiver 1032, and an antenna 1033. A network device 20 includes a processor 201, a memory 202, and a transceiver 203. The transceiver 203 includes a transmitter 2031, a receiver 2032, and an antenna 2033. The receiver 1032 may be configured to receive transmission control information through the antenna 1033, and the transmitter 1031 may be configured to send transmission feedback information to the network device 20 through the antenna 1033. The transmitter 2031 may be configured to send the transmission control information to the terminal device 10 through the antenna 2033. The receiver 2032 may be configured to receive, through the antenna 2033, the transmission feedback information sent by the terminal device 10.

The processor 101/processor 201 may be a CPU, a microprocessor, an application-specific integrated circuit (ASIC), or one or more integrated circuits configured to control program execution of the solutions of this application.

The memory 102/the memory 202 may be an apparatus having a storage function. For example, the memory may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through a communication line. Alternatively, the memory may be integrated with the processor.

The memory 102/memory 202 is configured to store computer-executable instructions for executing the solutions of this application, and the processor 101/processor 201 controls the execution. The processor 101/processor 201 is configured to execute the computer-executable instructions stored in the memory 102/memory 202, to implement the channel measurement method provided in embodiments of this application.

Alternatively, in embodiments of this application, the processor 101/processor 201 may perform a processing-related function in the channel measurement method provided in the following embodiments of this application.

The computer-executable instructions in embodiments of this application may also be referred to as application program code. This is not specifically limited in embodiments of this application.

It should be noted that the terms "system" and "network" may be used interchangeably in embodiments of this application. "A plurality of" means two or more. In view of this, "a plurality of" in embodiments of this application may also be understood as "at least two". The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects unless otherwise specified.

The following describes in detail the channel measurement method provided in embodiments of this application with reference to FIG. 1 to FIG. 8.

It should be understood that a beam in this application may be a common beam.

Figure 8:
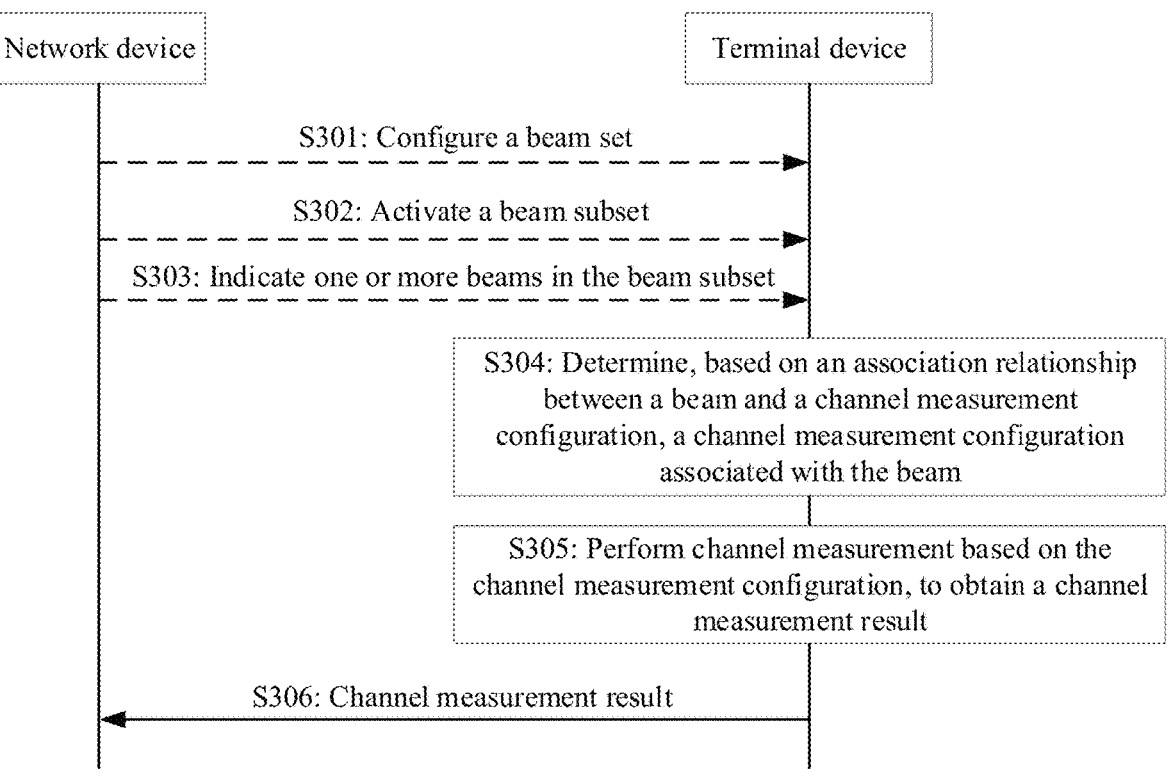
FIG. 8 is a schematic flowchart of a channel measurement method according to an embodiment of this application.

FIG. 8 is a schematic flowchart of a channel measurement method according to an embodiment of this application. The method may include the following steps.

S301: A network device configures a beam set for a terminal device.

Specifically, the network device sends RRC signaling to the terminal device, and the terminal device receives the RRC signaling. The RRC signaling includes the beam set configured for the terminal device. For example, the RRC signaling includes information about N beams, where N is a positive integer. For example, if the N beams are downlink transmit beams, the information about the N beams may be N TCI-states. However, a sending direction of a beam is not limited in this application. The N beams may be downlink common beams for downlink transmission, and/or uplink common beams for uplink transmission, and/or uplink and downlink common beams for both uplink and downlink transmission.

In another example, the network device may alternatively configure the beam set before performing the channel measurement solution in this embodiment. Therefore, this step is optional, and is represented by a dashed line in the figure.

S302: The network device activates a beam subset in the beam set.

After the network device configures the beam set, if a signal needs to be sent through a beam subset in the beam set, the beam subset in the beam set needs to be activated. The beam subset includes one or more beams. A quantity of beams included in the beam subset may be less than or equal to the beam set.

Specifically, the network device sends MAC CE signaling to the terminal device, and the terminal device receives the MAC CE signaling. The MAC CE signaling is for activating a beam subset in the beam set. The MAC CE signaling includes information about K beams in the N beams. K≤N, and K is a positive integer. Alternatively, the K beams may be downlink common beams for downlink transmission, and/or uplink common beams for uplink transmission, and/or uplink and downlink common beams for both uplink and downlink transmission.

In another example, the network device may alternatively activate the beam subset in the beam set before performing the channel measurement solution in this embodiment. Therefore, this step is optional, and is represented by a dashed line in the figure.

S303: The network device indicates one or more beams in the beam subset.

After activating the beam subset, the network device may send DCI signaling to the terminal device, and the terminal device receives the DCI signaling. The DCI signaling is for indicating the one or more beams (which may be all beams in the beam subset, or may be a part of beams in the beam subset) in the beam subset. Specifically, the one or more beams include a beam for downlink transmission, and may be a downlink common beam or an uplink and downlink common beam. The network device subsequently uses the downlink common beam or the uplink and downlink common beam to perform downlink transmission. Alternatively, the one or more beams include a beam for uplink transmission, and may be an uplink common beam or an uplink and downlink common beam. The network device subsequently uses the uplink common beam or the uplink and downlink common beam to perform uplink transmission.

In the foregoing method, if the beam subset activated by using the MAC CE signaling in S302 includes only a single beam, the beam is directly used for downlink transmission, and does not need to be further indicated through S303.

In another example, the network device may alternatively indicate the one or more beams in the beam subset before performing the channel measurement solution in this embodiment. Therefore, this step is optional, and is represented by a dashed line in the figure.

S304: The terminal device determines, based on an association relationship between a beam and a channel measurement configuration, a channel measurement configuration associated with the beam.

After indicating a new beam, the network device needs to obtain a channel measurement result corresponding to the new beam. In this embodiment, an association relationship between one or more beams and one or more channel measurement configurations is preset in the network device and the terminal device. The one or more beams may be one or more beams configured by using the RRC signaling, and/or one or more beams activated by using the MAC CE signaling, and/or one or more beams indicated by using the DCI signaling. In this case, each beam may establish an association relationship with one or more channel measurement configurations, and each beam has an associated channel measurement configuration. Therefore, after receiving one beam that is used for downlink transmission and that is activated by using the MAC CE signaling or indicated by using the DCI signaling, the terminal device may determine, based on the association relationship between the beam and the channel measurement configuration, a channel measurement configuration associated with the beam, and perform measurement based on the channel measurement configuration. Therefore, a channel of the activated or indicated beam is automatically measured when there is no dedicated signaling for indication. Alternatively, after receiving one beam that is used for uplink transmission and that is activated by using the MAC CE signaling or indicated by using the DCI signaling, the terminal device may determine, based on the association relationship between the beam and the channel measurement configuration, a channel measurement configuration associated with the beam, and send an uplink reference signal resource based on the channel measurement configuration, so that the network device performs uplink channel measurement of the beam. Therefore, a channel of the activated or indicated beam is automatically measured when there is no dedicated signaling for indication.

Specifically, the beam may be a beam indicated by using downlink signaling, for example, a beam indicated by using DCI signaling. When receiving the DCI signaling, the terminal device obtains information about the beam included in the DCI signaling, and may determine, based on the association relationship, a channel measurement configuration associated with the beam. Alternatively, the beam may be a beam activated by using downlink signaling, for example, a single beam activated by using the MAC CE signaling. The beam may be used for a transmission channel, and does not need to be further indicated by using DCI signaling. When receiving the MAC CE signaling, the terminal device obtains information about the single beam included in the MAC CE signaling, and may determine, based on the association relationship, a channel measurement configuration associated with the beam.

The beam may be a downlink beam for downlink transmission, and/or an uplink and downlink joint beam for both uplink and downlink transmission.

Further, before step S304, the network device may further configure or activate a plurality of channel measurement configurations for the terminal device. For example, the network device may configure a plurality of channel measurement configurations for the terminal device by using RRC signaling. Alternatively, the network device may activate a plurality of channel measurement configurations for the terminal device by using MAC CE signaling. A part or all of the plurality of configured or activated channel measurement configurations are used to automatically measure a channel of an indicated or activated beam. For example, the channel measurement configuration is a trigger state (trigger state). The network device configures 64 trigger states for the terminal device, and 16 trigger states are used to automatically measure a channel of an indicated or activated beam.

A specific form of the channel measurement configuration may be one or more of the following: a trigger state, a report configuration, a resource, and a resource set. The plurality of channel measurement configurations may be a plurality of trigger states, a plurality of report configurations, a plurality of resources, or a plurality of resource sets. The resource may be an SSB, a CSI-RS, CSI-IM, an SRS, or a CRS. The foregoing CSI-RS resource may be one or more of a CSI-RS resource for beam management, a CSI-RS resource for CSI measurement, a CSI-RS resource for time-frequency tracking, and a CSI-RS resource for mobility measurement. The CSI-RS resource for beam management is a resource in a CSI-RS resource set for which a repetition parameter is configured. The CSI-RS resource for time-frequency tracking is a resource in a CSI-RS resource set for which a trs-info parameter is configured. The CSI-RS resource for CSI measurement is a resource in a CSI-RS resource set for which no repetition parameter is configured and no trs-info parameter is configured. The CSI-RS resource for mobility measurement may be a CSI-RS resource configured in CSI-RS-ResourceConfigMobility. The foregoing CSI-RS may be one or more of four SRSs whose types are beam-Management, codebook, nonCodebook, and antennaSwithing.

The trigger state may be considered as a parameter set, and includes an associated resource and an associated report configuration.

The report configuration may be a periodic report configuration, a semi-persistent report configuration, and/or an aperiodic report configuration.

The resource may be a channel measurement resource and/or an interference measurement resource. The resource may be a periodic resource, a semi-persistent resource, and/or an aperiodic resource.

The resource set may be the foregoing resource setting, the resource set, a subset included in the resource set, or a resource set in another form.

After obtaining the plurality of channel measurement configurations configured or activated by the network device, the terminal device needs to determine a specific channel measurement configuration used to automatically measure the channel of the indicated or activated beam. The channel measurement configuration used to automatically measure the channel of the indicated or activated beam is a special channel measurement configuration. For ease of description, the channel measurement configuration is referred to as a first channel measurement configuration in this embodiment. When the terminal device receives a MAC CE for activating a beam or DCI for indicating a beam, the first channel measurement configuration is automatically activated or triggered, and the terminal device performs measurement based on the first channel measurement configuration, to measure channel information corresponding to the beam. There may be one or more first channel measurement configurations. The one or more first channel measurement configurations may be associated with one or more beams. A specific association relationship may be one-to-one association, one-to-many association, many-to-one association, or the like. When the terminal device receives a MAC CE for activating a beam or DCI for indicating a beam, a first channel measurement configuration associated with the beam is automatically activated or triggered, and the terminal device performs channel measurement based on the first channel measurement configuration, to obtain channel information corresponding to the beam.

Optionally, time at which the first channel measurement configuration associated with the beam is automatically activated or triggered may be a first moment plus a first time offset. The first moment may be a moment at which the terminal device receives the MAC CE signaling, a moment at which the terminal device receives the DCI signaling, a moment at which the terminal device feeds back ACK acknowledgment information corresponding to the MAC CE signaling or the DCI signaling, or a moment at which a beam activated by using the MAC CE signaling or indicated by using the DCI signaling takes effect. The first time offset may be configured by the network device, or may be reported by the terminal device, or may be determined in another manner, for example, specified in a protocol by default. This is not limited herein. The foregoing "moment" may be one slot, one symbol, one millisecond, one subframe, one frame, or the like.

The terminal device needs to determine the first channel measurement configuration from all channel measurement configurations by using the following several methods.

Manner 1: The first channel measurement configuration is a channel measurement configuration in which a first parameter is configured, and the first parameter indicates that the channel measurement configuration is the first channel measurement configuration. Herein, the channel measurement configuration in which the first parameter is configured means that the channel measurement configuration includes the first parameter. For example, if the network device configures eight channel measurement configurations for the terminal device, and a first parameter is configured in four channel measurement configurations, the four channel measurement configurations are four first channel measurement configurations.

Manner 2: The first channel measurement configuration is a channel measurement configuration in which a first parameter is configured as a first option, and the first option indicates that the channel measurement configuration is the first channel measurement configuration. The first option may also be referred to as a first value. For example, the first option may be "true", "on", "enabled", "yes", or another state value indicating a positive meaning. For example, if the network device configures eight channel measurement configurations for the terminal device, and values of first parameters in four channel measurement configurations are configured as first options, the four channel measurement configurations are four first channel measurement configurations.

Manner 3: The first channel measurement configuration is included in a specific channel measurement configuration set. In this embodiment, the set is referred to as a first set.

The channel measurement configuration included in the first set is the first channel measurement configuration. The first set may be understood as an upper-layer parameter, and the first channel measurement configuration may be included as a sub-parameter of the first configuration set. For example, if the channel measurement configuration is a trigger state, the first channel measurement configuration is also referred to as a first trigger state in this case. If the first set is a trigger state list (trigger state list), a trigger state in the trigger state list is the first trigger state.

Manner 4: The first channel measurement configuration is indicated by using dedicated signaling. For example, one or more channel measurement configurations are activated by using a MAC CE. The one or more channel measurement configurations activated by using the MAC CE are the first channel measurement configuration. For another example, the DCI is for indicating one or more channel measurement configurations. The one or more channel measurement configurations indicated by using the DCI are the first channel measurement configuration.

One or more first channel measurement configurations are associated with one or more beams. The one or more beams may be one or more beams in the beams configured by using the RRC signaling, and/or one or more beams in the beams activated by using the MAC CE signaling, and/or one beam indicated by using the DCI signaling.

In an implementation, the one or more beams are one or more beams in the beams configured by using the RRC signaling, or the one or more beams are one or more beams in the beams activated by using the MAC CE signaling. The one or more first channel measurement configurations are one-to-one associated with the one or more beams. A specific association manner is that after the one or more beams are sorted in a first order and the one or more first channel measurement configurations are sorted in a second order, the one or more first channel measurement configurations are one-to-one associated with the one or more beams. The first order includes any one of the following: a configuration order, an activation order, an ascending order of indexes, and a descending order of indexes. The second order includes any one of the following: a configuration order, an activation order, an ascending order of indexes, and a descending order of indexes.

Specifically, in an association manner, the first order is a configuration order, and the second order is also a configuration order. In this case, an $i^{th}$ beam in N beams configured by using the RRC signaling may be associated with an $i^{th}$ first channel measurement configuration in M configured first channel measurement configurations. For example, an order of four beams configured by using the RRC signaling is a beam 1, a beam 3, a beam 2, and a beam 4, and an order of four configured first channel measurement configurations is a channel measurement configuration 1, a channel measurement configuration 2, a channel measurement configuration 3, and a channel measurement configuration 4. In this case, the beam 1 is associated with the channel measurement configuration 1, the beam 3 is associated with the channel measurement configuration 2, the beam 2 is associated with the channel measurement configuration 3, and the beam 4 is associated with the channel measurement configuration 4.

In another association manner, the first order is an activation order, and the second order is a configuration order. In this case, an $i^{th}$ beam in K beams activated by using the MAC CE signaling may be associated with an $i^{th}$ first channel measurement configuration in M configured first channel measurement configurations. A configured but unactivated beam is not associated with a first channel measurement configuration. For example, an order of four beams activated by using the MAC CE signaling is a beam 1, a beam 3, a beam 2, and a beam 4, and an order of four configured first channel measurement configurations is a channel measurement configuration 1, a channel measurement configuration 2, a channel measurement configuration 3, and a channel measurement configuration 4. In this case, the beam 1 is associated with the channel measurement configuration 1, the beam 3 is associated with the channel measurement configuration 2, the beam 2 is associated with the channel measurement configuration 3, and the beam 4 is associated with the channel measurement configuration 4.

In another association manner, the first order is an activation order, and the second order is also an activation order. In this case, an $i^{th}$ beam in K beams activated by using the MAC CE signaling may be associated with an $i^{th}$ first channel measurement configuration in L activated first channel measurement configurations (where it is assumed that in M configured first channel measurement configurations, the network device activates L first channel measurement configurations by using the MAC CE). A configured but unactivated beam is not associated with a first channel measurement configuration.

In another association manner, the first order is a configuration order, and the second order is an activation order. In this case, an $i^{th}$ beam in N beams configured by using the RRC signaling may be associated with an $i^{th}$ first channel measurement configuration in L activated first channel measurement configurations.

In another association manner, each beam has a corresponding index, for example, a transmission configuration indicator state identifier (TCI-state ID). Each first channel measurement configuration also has a corresponding index. In this case, one or more beams and one or more first channel measurement configurations may be associated based on indexes. In other words, the first order is an index order of beams, and the second order is an index order of first channel measurement configurations.

Index orders are further classified into a descending order of indexes and an ascending order of indexes. In this case, there may be further the following association manners.

One or more beams and one or more first channel measurement configurations may be associated in descending order of indexes. For example, a beam with an $i^{th}$ largest index is associated with a first channel measurement configuration with an $i^{th}$ largest index.

One or more beams and one or more first channel measurement configurations may be associated in ascending order of indexes. For example, a beam with an $i^{th}$ smallest index is associated with a first channel measurement configuration with an $i^{th}$ smallest index.

One or more beams in descending order of indexes are associated with one or more first channel measurement configurations in ascending order of indexes.

One or more beams in ascending order of indexes are associated with one or more first channel measurement configurations in descending order of indexes.

In another association manner, N beams configured by using the RRC signaling or K beams activated by using the MAC CE signaling include an index of a to-be-associated first channel measurement configuration. In this case, the terminal device obtains an association relationship between a beam and a first channel measurement configuration.

In another association manner, one or more first channel measurement configurations include an index of one or more to-be-associated beams. In this case, the terminal device obtains an association relationship between a beam and a first channel measurement configuration.

In another association manner, one or more beams are sorted in ascending order of indexes, one or more first channel measurement configurations are sorted in a configuration/an activation order, and then the beams are one-to-one associated with the first channel measurement configurations. For example, a beam with an $i^{th}$ smallest index is associated with an $i^{th}$ first channel measurement configuration in M configured first channel measurement configurations/L activated first channel measurement configurations.

In another association manner, one or more beams are sorted in descending order of indexes, one or more first channel measurement configurations are sorted in a configuration/an activation order, and then the beams are one-to-one associated with the first channel measurement configurations. For example, a beam with an $i^{th}$ largest index is associated with an $i^{th}$ first channel measurement configuration in M configured first channel measurement configurations/L activated first channel measurement configurations.

In another association manner, one or more beams are sorted in a configuration/an activation order, one or more first channel measurement configurations are sorted in ascending order of indexes, and then the beams are one-to-one associated with the first channel measurement configurations. For example, an $i^{th}$ beam in N configured beams/K activated beams is associated with a first channel measurement configuration with an $i^{th}$ smallest index.

In another association manner, one or more beams are sorted in a configuration/an activation order, one or more first channel measurement configurations are sorted in descending order of indexes, and then the beams are one-to-one associated with the first channel measurement configurations. For example, an $i^{th}$ beam in N configured beams/K activated beams is associated with a first channel measurement configuration with an $i^{th}$ largest index.

In another implementation, the one or more beams are one beam indicated by using the DCI. Specifically, the beam may be a downlink common beam, an uplink common beam, or an uplink and downlink common beam. The beam indicated by using the DCI is associated with one or more first channel measurement configurations. When the DCI is for indicating one beam, the one or more first channel measurement configurations are automatically activated or triggered, and the terminal device measures, based on the one or more first channel measurement configurations, channel information of the beam indicated by using the DCI. The one or more first channel measurement configurations are not associated with a fixed beam, but are always associated with the beam indicated by using the DCI. If the beam indicated by using the DCI changes, the beam associated with the one or more first channel measurement configurations also changes, that is, the beam whose channel is to be measured also changes. For example, when the DCI is for indicating a beam 1, the one or more first channel measurement configurations are automatically activated or triggered to measure channel information of the beam 1. When the DCI is for indicating a beam 2, the one or more first channel measurement configurations are automatically activated or triggered to measure channel information of the beam 2.

Further, in the foregoing association manners, if one or more first channel measurement configurations are associated with one beam, each of the one or more first channel measurement configurations has a QCL relationship with the beam. Because the first channel measurement configuration is used to measure a channel of the beam associated with the first channel measurement configuration, the first channel measurement configuration needs to meet a QCL relationship with the beam associated with the first channel measurement configuration. When the associated beam changes, the QCL relationship of the first channel measurement configuration also automatically changes, to ensure that the channel measurement configuration always meets the QCL relationship with the beam associated with the channel measurement configuration. For example, assuming that an $i^{th}$ beam activated by using the MAC CE is associated with one or more first channel measurement configurations, the one or more first channel measurement configurations and the $i^{th}$ beam activated by using the MAC CE meet the QCL relationship. For example, if the $i^{th}$ beam activated by using the MAC CE is the beam 1, there is the QCL relationship between the one or more first channel measurement configurations and the beam 1. If the beam activated by using the MAC CE changes and the $i^{th}$ activated beam changes to the beam 2, QCL information of the one or more first channel measurement configurations changes, and the one or more first channel measurement configurations change to have the QCL relationship with the beam 2.

For example, assuming that a beam indicated by using the DCI is associated with one or more first channel measurement configurations, the one or more first channel measurement configurations and the beam indicated by using the DCI meet the QCL relationship. For example, if the beam indicated by using the DCI is the beam 1, there is the QCL relationship between the one or more first channel measurement configurations and the beam 1. When the beam indicated by using the DCI changes to the beam 2, QCL information of the one or more first channel measurement configurations changes, and the one or more first channel measurement configurations change to have the QCL relationship with the beam 2. In other words, the terminal device always uses a TCI-state, QCL information, or a QCL assumption of the beam associated with the first channel measurement configuration as a TCI-state, QCL information, or a QCL assumption of the first channel measurement configuration. For example, the first channel measurement configuration is a trigger state or a report configuration, and the trigger state or the report configuration always uses a TCI-state, QCL information, or a QCL assumption of a beam associated with the trigger state or the report configuration as a TCI-state, QCL information, or a QCL assumption of a measurement resource (for example, a channel measurement resource and/or an interference measurement resource) in the trigger state or the report configuration. In the foregoing method, the beam is associated with the first channel measurement configuration in a specific order, and the first channel measurement configuration maintains the QCL relationship with the beam associated with the first channel measurement configuration.

In another association manner, one or more beams are directly associated with one or more first channel measurement configurations based on the QCL relationship. To be specific, if the one or more beams and the one or more first channel measurement configurations meet the QCL relationship, the one or more beams are associated with the one or more first channel measurement configurations.

In the foregoing method, that the beam and the first channel measurement configuration meet the QCL relationship includes:

a TCI-state or an index corresponding to the beam is the same as a TCI-state or an index corresponding to the first channel measurement configuration;

a TCI-state corresponding to the beam and a TCI-state corresponding to the first channel measurement configuration meet the QCL relationship;

a QCL resource corresponding to the beam is the same as a QCL resource corresponding to the first channel measurement configuration; or there is the QCL relationship between a QCL resource corresponding to the beam and a QCL resource corresponding to the first channel measurement configuration.

In the foregoing association relationship, if the first channel measurement configuration is a resource/resource set, a TCI-state/QCL resource corresponding to the first channel measurement configuration is a TCI-state/QCL resource used for the resource/resource set. If the first channel measurement configuration is a trigger state/report configuration, a TCI-state/QCL resource corresponding to the first channel measurement configuration is a TCI-state/QCL resource used for a measurement resource associated with the trigger state/report configuration.

In the foregoing association relationship, the QCL resource, that is, a target reference signal resource in the TCI-state, indicates beam information. Specifically, the QCL resource may be a QCL resource whose type is typeD.

In the foregoing association relationship, the QCL relationship indicates a specific relationship between a channel or a reference signal using the TCI-state and a QCL resource in the TCI-state. Specifically, there are four QCL relationships: typeA (typeA), typeB (typeB), typeC (typeC), and typeD (typeD). The QCL relationship of typeD is that receive beams mentioned above are the same. For example, if a PDSCH uses a TCI-state, and a QCL resource corresponding to a QCL relationship whose type is typeD in the TCI-state is a resource i, it indicates that the PDSCH uses a same receive beam as the resource i.

In an example, in the foregoing association relationship, the QCL relationship may be a QCL relationship whose type is typeD, and the QCL resource may be a QCL resource whose type is typeD.

The foregoing describes that after the DCI is for indicating the beam or the MAC CE is for activating the beam, the corresponding first channel measurement configuration is automatically triggered/activated. A condition for triggering/activating the corresponding first channel measurement configuration is uniformly described below.

For a first channel measurement configuration, when a first condition is met, the first channel measurement configuration is automatically triggered/activated, that is, the terminal device may perform channel measurement based on the first channel measurement configuration.

The first condition includes one or more of the following:

(1) DCI is for indicating a beam.

(2) A beam indicated by using DCI this time is different from a beam indicated by using DCI last time, which may also be understood as that a beam indicated by using DCI is different from a currently used beam. Different beams may mean that corresponding TCI-states are different, or QCL resources in corresponding TCI-states are different.

(3) A MAC CE is for activating a beam.

(4) A beam activated by using a MAC CE this time is different from a beam activated by using a MAC CE last time, which may also be understood as that a beam activated by using a MAC CE is different from a currently used beam. Different beams may mean that corresponding TCI-states are different, or QCL resources in corresponding TCI-states are different.

(5) A type of a beam indicated by using DCI or activated by using a MAC CE is a downlink common beam for downlink transmission or an uplink and downlink common beam for uplink and downlink joint transmission. It should be understood that this is applicable to a case in which the first channel measurement configuration is a channel measurement configuration that is related to downlink channel measurement, such as a trigger state, a report configuration, a downlink reference signal resource, or a downlink reference signal resource set.

(6) A type of a beam indicated by using DCI or activated by using a MAC CE is an uplink common beam for uplink transmission or an uplink and downlink common beam for uplink and downlink joint transmission. It should be understood that this is applicable to a case in which the first channel measurement configuration is a channel measurement configuration that is related to uplink channel measurement, such as a trigger state, a report configuration, an uplink reference signal resource, or an uplink reference signal resource set.

(7) The first channel measurement configuration has an association relationship with a beam indicated by using DCI or activated by using a MAC CE.

(8) A switch for a function of automatically triggering the associated first channel measurement configuration based on a beam indication or beam activation is configured as an enabled state. For example, RRC signaling for configuring a beam includes a function switch parameter. When the function switch parameter is configured as an enabled state, the foregoing function of automatically activating or triggering the associated first channel measurement configuration may be used.

(9) Current time is a first moment plus a first time offset. The first moment may be a moment at which the MAC CE signaling is received, a moment at which the DCI signaling is received, a moment at which ACK acknowledgment information of the MAC CE signaling or the DCI signaling is fed back, or a moment at which a beam activated by using the MAC CE signaling or indicated by using the DCI signaling takes effect. The first time offset may be configured by the network device, or may be reported by the terminal device, or may be determined in another manner, for example, specified in a protocol by default. This is not limited herein.

It may be understood that the first condition includes but is not limited to one or a combination of the foregoing. Alternatively, the first condition may be a combination of one or more of the foregoing and another condition. The "combination" may be a logical "AND" operation, a logical "OR" operation, a logical "NO" operation, or a combination of a plurality of operations on a plurality of conditions.

S305: The terminal device performs channel measurement based on the channel measurement configuration, to obtain a channel measurement result.

The terminal device may measure, based on the triggered or activated channel measurement configuration, a reference signal sent through the activated or indicated beam, to obtain the channel measurement result. The channel measurement result includes at least one of the following: a CQI, an RI, a PMI, and an LI. For a specific channel measurement process, refer to the foregoing definition descriptions of the channel measurement.

S306: The terminal device reports the channel measurement result to the network device. Correspondingly, the network device receives the channel measurement result.

After obtaining the channel measurement result, the terminal device needs to report the channel measurement result to the network device, so that the network device can learn of channel information corresponding to the new beam.

The channel measurement result may be reported through an uplink transmission channel, for example, through a PUCCH or a PUSCH.

Specifically, the terminal device performs reporting based on the configured report configuration. The report configuration may be classified into four types: a periodic report configuration, an aperiodic report configuration, a semi-persistent report configuration type 1, and a semi-persistent report configuration type 2. The periodic report configuration is that periodic reporting is performed once configured. The aperiodic report configuration is that reporting needs to be performed only through triggering of the DCI signaling and reporting is performed once when the aperiodic report configuration is triggered once. A semi-persistent report configuration is similar to the periodic report configuration but does not take effect immediately after configured. Instead, reporting is performed periodically after the semi-persistent report configuration is activated, and reporting is stopped after the semi-persistent report configuration is deactivated. Both the semi-persistent report configuration type 1 and the semi-persistent report configuration type 2 are semi-persistent report configurations. A difference lies in that the semi-persistent report configuration type 1 is activated by using MAC-CE signaling, and a measurement result is reported through a PUCCH. Therefore, the semi-persistent report configuration type 1 may also be referred to as semiPersistentOnPUCCH. The semi-persistent report configuration type 2 is activated by using DCI signaling, and a measurement result is reported through a PUSCH scheduled by using the DCI. Therefore, the semi-persistent report configuration type 2 may also be referred to as semiPersistentOnPUSCH.

In the foregoing four report configurations, the periodic report configuration and the semi-persistent report configuration type 1 use the PUCCH to report the measurement result. PUCCH resources for reporting are configured in the two types of report configurations.

The aperiodic report configuration and the semi-persistent report configuration type 2 use the PUSCH to report the measurement result. The aperiodic report configuration and the semi-persistent report configuration type 2 are triggered/activated by using the DCI signaling. Specifically, triggering/activation is performed by using DCI (for example, a DCI format 0-0/0-1) for uplink scheduling. When triggering/activating a report configuration, the DCI for uplink scheduling may incidentally schedule a PUSCH, to report a measurement result. Because the reported result is reported through the PUSCH, PUCCH resources cannot be configured in the two types of report configurations.

In addition, the aperiodic report configuration and the semi-persistent report configuration type 2 cannot be triggered/activated by using DCI (for example, a DCI format 1-0/1-1) for downlink scheduling because the DCI for downlink scheduling cannot schedule a PUSCH, and a measurement result cannot be reported. Therefore, there is a problem: If the DCI for downlink scheduling is for indicating a new beam, how to implement automatic measurement and reporting of a channel of the new beam.

In one method, PUCCH resources may be included in the aperiodic report configuration and the report configuration of the semi-persistent report configuration type 2.

Specifically, in an implementation, it may be specified that an aperiodic report configuration and/or a report configuration of a semi-persistent report configuration type 2 include/includes PUCCH resources/a PUCCH resource only when a second condition is met. The second condition includes but is not limited to one or a combination of the following:

(1) Types of the aperiodic report configuration and the semi-persistent report configuration type 2 are first report configurations.

(2) A switch for a function of automatically triggering the associated first channel measurement configuration based on a beam indication or beam activation is configured as an enabled state. For example, RRC signaling for configuring a beam includes a function switch parameter. When the parameter is configured as an enabled state, the foregoing function of automatically activating or triggering the associated first channel measurement configuration may be used.

It may be understood that the second condition includes but is not limited to one or a combination of the foregoing. Alternatively, the second condition may be a combination of one or more of the foregoing and another condition. The "combination" may be a logical "AND" operation, a logical "OR" operation, a logical "NO" operation, or a combination of a plurality of operations on a plurality of conditions.

In another implementation, it may be specified that PUCCH resources need to be configured in the aperiodic report configuration and the report configuration of the semi-persistent report configuration type 2 when a third condition is met. The third condition includes but is not limited to one or a combination of the following:

(1) Types of the aperiodic report configuration and the semi-persistent report configuration type 2 are first report configurations.

(2) A switch for a function of automatically triggering the associated first channel measurement configuration based on a beam indication or beam activation is configured as an enabled state. For example, RRC signaling for configuring a beam includes a function switch parameter. When the parameter is configured as an enabled state, the foregoing function of automatically activating or triggering the associated first channel measurement configuration may be used.

It may be understood that the third condition includes but is not limited to one or a combination of the foregoing. Alternatively, the third condition may be a combination of one or more of the foregoing and another condition. The "combination" may be a logical "AND" operation, a logical "OR" operation, a logical "NO" operation, or a combination of a plurality of operations on a plurality of conditions.

If no PUCCH resource is configured in the aperiodic report configuration and/or the semi-persistent report configuration type 2, the report configuration can be triggered/activated only by using DCI for uplink scheduling. In other words, the terminal device triggers/activates the report configuration or a trigger state corresponding to the report configuration only when the terminal device receives DCI for uplink scheduling to indicate a new beam. In other words, if DCI for downlink scheduling is received to indicate a new beam, the report configuration or a trigger state corresponding to the report configuration is not triggered/activated.

If PUCCH resources/a PUCCH resource are/is configured in the aperiodic report configuration and/or the semi-persistent report configuration type 2, the report configuration may be triggered/activated by using the DCI for uplink scheduling, or may be triggered/activated by using the DCI for downlink scheduling. Specifically, when the DCI for downlink scheduling is for indicating the new beam, a result of triggered/activated channel measurement is reported through a PUCCH. When the DCI for uplink scheduling is for indicating the new beam, a result of triggered/activated measurement is reported through a PUSCH. Alternatively, when the DCI for uplink scheduling is for indicating the new beam, a result of triggered/activated measurement may be reported through a PUCCH or a PUSCH, depending on whether the DCI schedules the PUSCH. If the DCI schedules the PUSCH, the PUSCH is used for reporting. If the DCI does not schedule the PUSCH, the PUCCH is used for reporting.

In another method, DCI is allowed to trigger/activate the report configuration of the semi-persistent type 1. A channel measurement result reported through the report configuration of the semi-persistent type 1 may be reported through a PUCCH. In this way, measurement reporting triggered by using DCI for downlink scheduling may be implemented through the report configuration of the semi-persistent type 1.

During implementation of the method, it may be specified that the report configuration of the semi-persistent type 1 can be triggered by using the DCI to indicate a beam only when a fourth condition is met. The fourth condition includes but is not limited to one or a combination of the following:

(1) Types of the aperiodic report configuration and the semi-persistent report configuration type 2 are first report configurations, that is, the report configuration is associated with a specific beam, in other words, the report configuration is a report configuration used to automatically measure a channel of a new beam.

(2) A switch for a function of automatically triggering channel measurement based on a beam indication is configured as an enabled state. For example, RRC signaling for configuring a beam includes a function switch parameter. When the parameter is configured as an enabled state, the foregoing function of automatically triggering measurement of the associated channel measurement configuration may be used.

It may be understood that the fourth condition includes but is not limited to one or a combination of the foregoing. Alternatively, the fourth condition may be a combination of one or more of the foregoing and another condition. The "combination" may be a logical "AND" operation, a logical "OR" operation, a logical "NO" operation, or a combination of a plurality of operations on a plurality of conditions.

According to the channel measurement method provided in this embodiment of this application, when channel quality of a new beam needs to be measured, the network device does not need dedicated signaling to indicate a channel measurement configuration associated with the new beam. When the beam is indicated or activated, the terminal device is triggered to perform channel measurement, to implement low-latency and low-overhead channel measurement.

It may be understood that, in the foregoing embodiments, methods and/or steps implemented by the terminal device may alternatively be implemented by a component (for example, a chip or a circuit) that may be used in the terminal device, and methods and/or steps implemented by the network device may alternatively be implemented by a component (for example, a chip or a circuit) that may be used in the network device.

The foregoing mainly describes the solutions provided in embodiments of this application from the perspective of interaction between network elements. Correspondingly, an embodiment of this application further provides a channel measurement apparatus, and the channel measurement apparatus is configured to implement the foregoing methods. The channel measurement apparatus may be the terminal device in the foregoing method embodiments, or may be a component that may be used in the terminal device; or the channel measurement apparatus may be the network device in the foregoing method embodiments, or may be a component that may be used in the network device. It may be understood that, to implement the foregoing functions, the channel measurement apparatus includes a hardware structure and/or a software module for performing a corresponding function. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the channel measurement apparatus may be divided into functional modules according to the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division during actual implementation.

Based on the same concept as the foregoing channel measurement method, this application further provides the following channel measurement apparatus.

Figure 9:
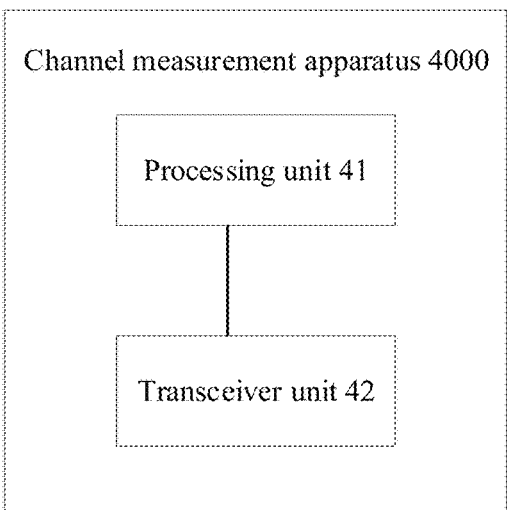
FIG. 9 is a schematic diagram of a structure of a channel measurement apparatus according to an embodiment of this application.

FIG. 9 is a schematic diagram of a structure of a channel measurement apparatus according to an embodiment of this application. The channel measurement apparatus may be the foregoing terminal device. The apparatus 4000 includes a processing unit 41 and a transceiver unit 42.

The processing unit 41 is configured to determine a beam indicated or activated by using downlink signaling.

The processing unit 41 is further configured to determine, based on an association relationship between a beam and a channel measurement configuration, a channel measurement configuration associated with the beam.

The processing unit 41 is further configured to perform channel measurement based on the channel measurement configuration, to obtain a channel measurement result.

The transceiver unit 42 is configured to report the channel measurement result.

For specific implementations of the processing unit 41 and the transceiver unit 42, refer to related descriptions of the terminal device in the embodiment shown in FIG. 8.

According to the channel measurement apparatus provided in this embodiment of this application, when channel quality of a new beam needs to be measured, a network device does not need dedicated signaling to indicate a channel measurement configuration associated with the new beam. When the beam is indicated or activated, the terminal device is triggered to perform channel measurement, to implement low-latency and low-overhead channel measurement.

Figure 10:
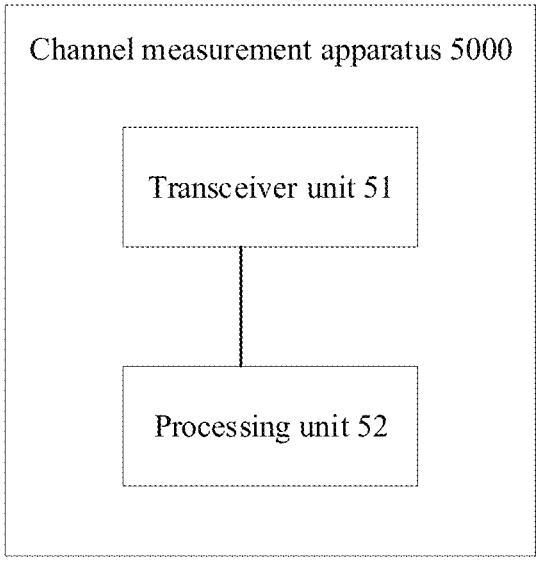
FIG. 10 is a schematic diagram of a structure of another channel measurement apparatus according to an embodiment of this application.

FIG. 10 is a schematic diagram of a structure of a channel measurement apparatus according to an embodiment of this application. The channel measurement apparatus may be the foregoing network device. The apparatus 5000 includes a transceiver unit 51 and a processing unit 52.

The transceiver unit 51 is configured to send downlink signaling, where the downlink signaling is for indicating or activating a beam.

The processing unit 52 is configured to determine, based on an association relationship between a beam and a channel measurement configuration, a channel measurement configuration associated with the beam.

The transceiver unit 51 is further configured to send, through the beam, a reference signal corresponding to the channel measurement configuration.

The transceiver unit 51 is further configured to receive a channel measurement result of the reference signal.

For specific implementations of the transceiver unit 51 and the processing unit 52, refer to related descriptions of the network device in the embodiment shown in FIG. 8.

According to the channel measurement apparatus provided in this embodiment of this application, when channel quality of a new beam needs to be measured, the network device does not need dedicated signaling to indicate a channel measurement configuration associated with the new beam. When the beam is indicated or activated, a terminal device is triggered to perform channel measurement, to implement low-latency and low-overhead channel measurement.

Figure 11:
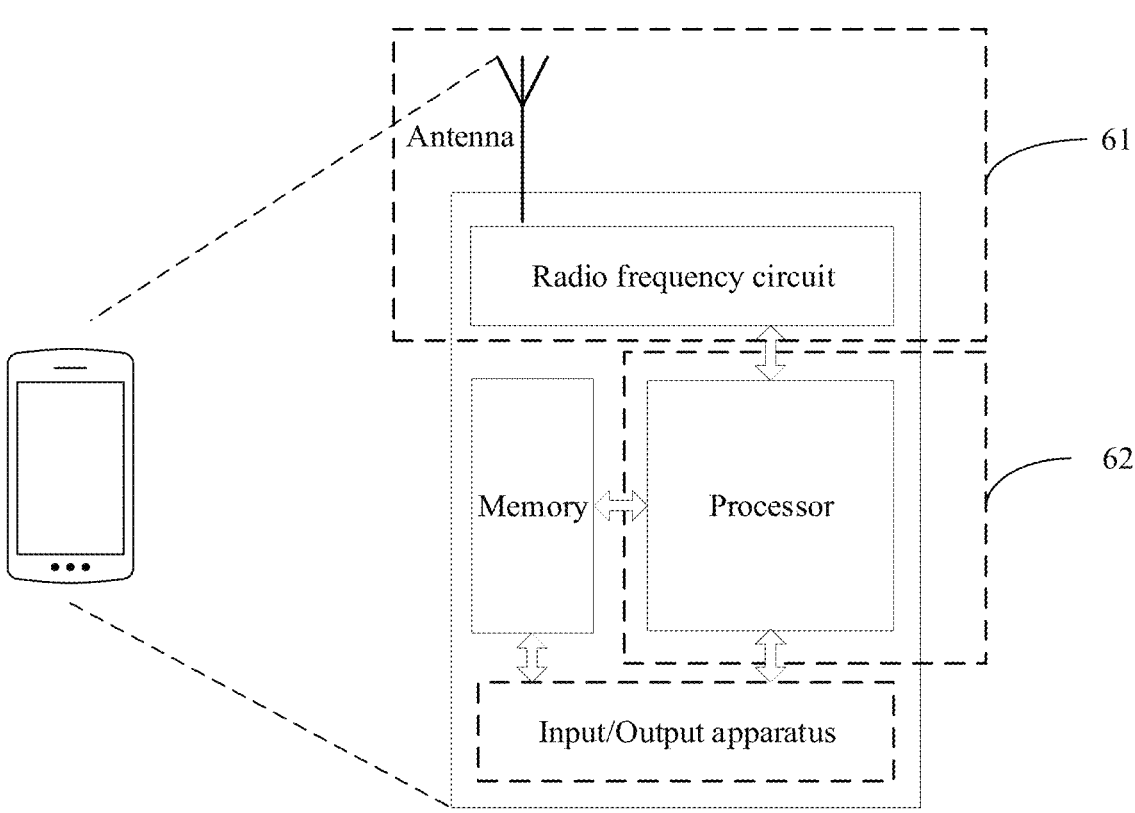
FIG. 11 is a simplified schematic diagram of a structure of a terminal device according to an embodiment of this application.

FIG. 11 is a simplified schematic diagram of a structure of a terminal device. For ease of understanding and ease of illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and send the radio frequency signal in a form of an electromagnetic wave. The input/output apparatus is, for example, a touchscreen, a display, or a keyboard, and is mainly configured to: receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, FIG. 11 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna having sending and receiving functions and the radio frequency circuit may be considered as a receiving unit and a sending unit (which may also be collectively referred to as a transceiver unit) of the terminal device, and the processor having a processing function may be considered as a processing unit of the terminal device. As shown in FIG. 11, the terminal device includes a transceiver unit 61 and a processing unit 62. The transceiver unit 61 may also be referred to as a receiver/sender (transmitter), a receiver/transmitter machine, a receiver/transmitter circuit, or the like. The processing unit 62 may also be referred to as a processor, a processing board, a processing module, a processing apparatus, or the like. The transceiver unit 61 is configured to implement a function of the transceiver unit 42 in the embodiment shown in FIG. 9.

For example, in an embodiment, the transceiver unit 61 is configured to perform functions performed by the terminal in steps S301 to S303 and S306 in the embodiment shown in FIG. 8, and the processing unit 62 is configured to perform steps S304 and S305 in the embodiment shown in FIG. 8.

Figure 12:
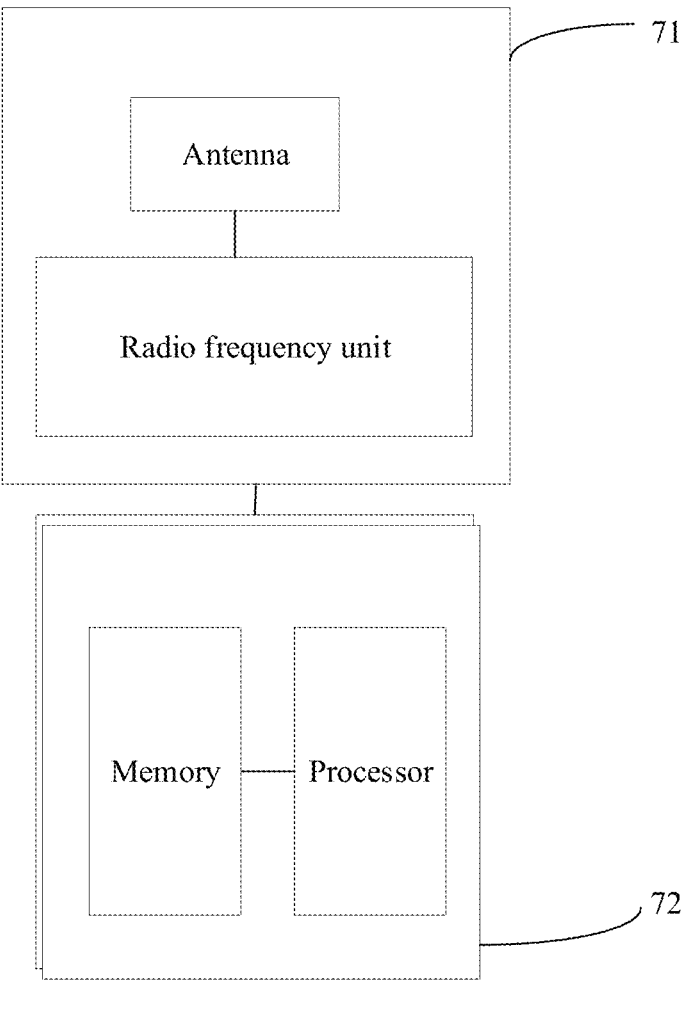
FIG. 12 is a simplified schematic diagram of a structure of a network device according to an embodiment of this application.

FIG. 12 is a simplified schematic diagram of a structure of a network device. The network device includes a part 72 and a part for radio frequency signal transmission/reception and conversion, and the part for radio frequency signal transmission/reception and conversion further includes a transceiver unit 71. The part for radio frequency signal transmission/reception and conversion is mainly configured to: send/receive a radio frequency signal and perform conversion between a radio frequency signal and a baseband signal. The part 72 is mainly configured to: perform baseband processing, control the network device, and the like. The transceiver unit 71 may also be referred to as a receiver/sender (transmitter), a receiver/transmitter machine, a receiver/transmitter circuit, or the like. The part 72 is usually a control center of the network device, may be usually referred to as a processing unit, and is configured to control the source network device to perform the steps performed by the network device in FIG. 7A and FIG. 7B. For details, refer to the foregoing descriptions of the related parts. The transceiver unit 71 may be configured to implement a function of the transceiver unit 51 in the embodiment shown in FIG. 10.

The part 72 may include one or more boards. Each board may include one or more processors and one or more memories. The processor is configured to read and execute a program in the memory to implement a baseband processing function and control the network device. If there are a plurality of boards, the boards may be interconnected to improve a processing capability. In an optional implementation, a plurality of boards may share one or more processors, a plurality of boards may share one or more memories, or a plurality of boards may simultaneously share one or more processors.

For example, in an embodiment, the transceiver unit 71 is configured to perform functions performed by the network device in steps S301 to S303 and S306 in the embodiment shown in FIG. 8.

An embodiment of this application further provides a computer-readable storage medium. The computer-readable storage medium stores a computer program or instructions, and when the computer program or the instructions are executed, the methods in the foregoing embodiments are implemented.

An embodiment of this application further provides a computer program product including instructions. When the instructions are run on a computer, the computer is enabled to perform the methods in the foregoing embodiments.

An embodiment of this application further provides a communication system, including the foregoing channel measurement apparatus.

It should be noted that the foregoing units or one or more of the units may be implemented by software, hardware, or a combination thereof. When any one of the units or the units are implemented by the software, the software exists in a form of computer program instructions, and is stored in a memory. A processor may be configured to execute the program instructions to implement the foregoing method procedures. The processor may be built in a system on chip (SoC) or an ASIC, or may be an independent semiconductor chip. In addition to a core for executing software instructions to perform operations or processing, the processor may further include a necessary hardware accelerator, for example, a field programmable gate array (FPGA), a programmable logic device (PLD), or a logic circuit that implements a dedicated logic operation.

When the foregoing modules or units are implemented by hardware, the hardware may be any one or any combination of a CPU, a microprocessor, a digital signal processor (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface. The at least one processor is coupled to a memory through the interface. When the at least one processor runs a computer program or instructions in the memory, the chip system is enabled to perform the method in any one of the foregoing method embodiments. Optionally, the chip system may include a chip, or may include a chip and another discrete device. This is not specifically limited in this embodiment of this application.

It should be understood that unless otherwise specified, "/" in descriptions of this application indicates an "or" relationship between associated objects. For example, A/B may indicate A or B. A and B may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme.

Exactly, use of the term such as "example" or "for example" is intended to present a relative concept in a specific manner for ease of understanding.

All or some of the foregoing embodiments may be implemented by software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable media accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" (comprising) does not exclude another component or another step, and "a" or "one" does not exclude a case of a plurality of. A single processor or another unit may implement several functions enumerated in the claims. Some measures are set forth in dependent claims that are different from each other, but this does not mean that these measures cannot be combined to produce a great effect.

What is claimed is:

1. A channel measurement method, comprising:
receiving a radio resource control (RRC) signaling that comprises a function switch parameter, wherein the function switch parameter is configured as an enabled state indicating that a function of automatically activating or triggering an associated channel measurement configuration based on a beam activation is used;
receiving a downlink signaling for activating a beam;
determining, based on the function switch parameter, the beam activated by the downlink signaling and an association relationship between one or more beams and one or more channel measurement configurations, a channel measurement configuration associated with the beam;
performing channel measurement based on the channel measurement configuration, to obtain a channel measurement result; and
reporting the channel measurement result.

2. The method of claim 1, wherein the channel measurement configuration comprises one or more of the following: a trigger state, a report configuration, a resource, or a resource set.

3. The method of claim 1, wherein the one or more beams comprise at least one of the following:
one or more beams configured by a RRC signaling;
one or more beams activated by a media access control control element (MAC CE) signaling; or
one or more beams indicated by a downlink control information (DCI) signaling.

4. The method of claim 1, wherein the one or more channel measurement configurations comprise at least one of the following:
a channel measurement configuration comprising a first parameter indicating whether the channel measurement configuration is a first channel measurement configuration used to automatically measure a channel of an indicated or activated beam.

5. The method of claim 1, wherein in the association relationship between the one or more beams and the one or more channel measurement configurations, the one or more beams correspond to a first order, the one or more channel measurement configurations correspond to a second order, and the one or more beams in the first order are one-to-one associated with the one or more channel measurement configurations in the second order;
the first order comprises any one of the following: a configuration order, an activation order, an indication order, a descending order of indexes, and an ascending order of indexes; and
the second order comprises any one of the following: a configuration order, an activation order, an indication order, a descending order of indexes, and an ascending order of indexes.

6. The method of claim 1, wherein each of the one or more channel measurement configurations has a quasi-colocation (QCL) relationship with a beam associated with the each channel measurement configuration.

7. The method of claim 1, wherein the association relationship comprises a quasi-colocation (QCL) relationship:
a beam and a channel measurement configuration that correspond to a same transmission configuration indicator state (TCI-state) have an association relationship;
a beam and a channel measurement configuration that correspond to a same QCL resource have an association relationship; or
a beam and a channel measurement configuration whose corresponding QCL resources have the QCL relationship have an association relationship.

8. The method of claim 1, wherein the channel measurement configuration is a report configuration, and a type of the report configuration is an aperiodic report configuration triggered by using downlink control information (DCI) signaling or a semi-persistent report configuration activated by using DCI signaling; and
the report configuration comprises a physical uplink control channel (PUCCH) resource used to report the channel measurement result.

9. A channel measurement method, comprising:
sending a radio resource control (RRC) signaling that comprises a function switch parameter, wherein the function switch parameter is configured as an enabled state indicating that a function of automatically activating or triggering an associated channel measurement configuration based on a beam activation is used;
sending a downlink signaling for activating a beam;
determining, based on an association relationship between one or more beams and one or more channel measurement configurations, a channel measurement configuration associated with the beam;

sending, through the beam, a reference signal corresponding to the channel measurement configuration; and receiving a channel measurement result of the reference signal.

10. A channel measurement apparatus, comprising a processor and a transceiver, wherein the processor is configured to:

receive a radio resource control (RRC) signaling that comprises a function switch parameter, wherein the function switch parameter is configured as an enabled state indicating that a function of automatically activating or triggering an associated channel measurement configuration based on a beam activation is used;

receive a downlink signaling for activating a beam;

determine, based on the function switch parameter, the beam activated by the downlink signaling and an association relationship between one or more beams and one or more channel measurement configurations, a channel measurement configuration associated with the beam;

perform channel measurement based on the channel measurement configuration, to obtain a channel measurement result; and report the channel measurement result through the transceiver.

11. The apparatus of claim 10, wherein the channel measurement configuration comprises one or more of the following: a trigger state, a report configuration, a resource, or a resource set.

12. The apparatus of claim 10, wherein the one or more beams comprise at least one of the following:

one or more beams configured by a RRC signaling;

one or more beams activated by a media access control control element (MAC CE) signaling; or one or more beams indicated by a downlink control information (DCI) signaling.

13. The apparatus of claim 10, wherein the one or more channel measurement configurations comprise at least one of the following:

a channel measurement configuration comprising a first parameter indicating whether the channel measurement configuration is a first channel measurement configuration used to automatically measure a channel of an indicated or activated beam.

14. The apparatus of claim 10, wherein in the association relationship between the one or more beams and the one or more channel measurement configurations, the one or more beams correspond to a first order, the one or more channel measurement configurations correspond to a second order, and the one or more beams in the first order are one-to-one associated with the one or more channel measurement configurations in the second order;

the first order comprises any one of the following: a configuration order, an activation order, an indication order, a descending order of indexes, and an ascending order of indexes; and the second order comprises any one of the following: a configuration order, an activation order, an indication order, a descending order of indexes, and an ascending order of indexes.

15. The apparatus of claim 10, wherein the association relationship comprises a quasi-colocation (QCL) relationship:

a beam and a channel measurement configuration that correspond to a same transmission configuration indicator state (TCI-state) have an association relationship;

a beam and a channel measurement configuration that correspond to a same QCL resource have an association relationship; or a beam and a channel measurement configuration whose corresponding QCL resources have the QCL relationship have an association relationship.

* * * * *